United States Patent
Carbajal Orozco et al.

(10) Patent No.: US 11,343,555 B2
(45) Date of Patent: May 24, 2022

(54) ALLOCATION OF UNDER DELIVERY UNITS UTILIZING AN OPTIMIZATION FRAMEWORK

(71) Applicant: Turner Broadcasting System, Inc., Atlanta, GA (US)

(72) Inventors: José Antonio Carbajal Orozco, Atlanta, GA (US); Wassim Samir Chaar, Coppell, TX (US); David James Benoit, Fayetteville, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 485 days.

(21) Appl. No.: 15/091,475

(22) Filed: Apr. 5, 2016

(65) Prior Publication Data
US 2017/0289600 A1    Oct. 5, 2017

(51) Int. Cl.
*G06Q 30/02* (2012.01)
*H04N 21/262* (2011.01)
(Continued)

(52) U.S. Cl.
CPC ... *H04N 21/26208* (2013.01); *G06Q 30/0251* (2013.01); *G06Q 30/0273* (2013.01);
(Continued)

(58) Field of Classification Search
None
See application file for complete search history.

(56) References Cited

U.S. PATENT DOCUMENTS 6,947,450 B2    9/2005  Mangin
7,873,541 B1    1/2011  Klar et al.
(Continued)

FOREIGN PATENT DOCUMENTS

JP    WO 2001/007985 A3 *  7/1999  ............ G06F 15/00
WO        0051335 A2       8/2000
(Continued)

OTHER PUBLICATIONS

Araman & Popescu, Media Revenue Management with Audience Uncertainty: Balancing Upfront and Spot Market Sales, Spring 2010, Manufacturing & Service Operations Management, vol. 12, No. 2, pp. 190-212 (Year: 2010).*
(Continued)

*Primary Examiner* — John Van Bramer
(74) *Attorney, Agent, or Firm* — Chip Law Group

(57) ABSTRACT

A television advertising management system that handles a plurality of deals for a plurality of advertiser, determines which of the plurality of deals have a guaranteed audience, and are under delivering, and allocates reserve under delivery units to each of the plurality of deals that are under delivering to bring each of the plurality of deals that are under delivering to corresponding attainable lower targets while honoring corresponding deal constraints. An under delivery value is maximized such that the attainable lower targets are met, while honoring corresponding deal constraints to provide an allocation solution, and a total penalty from deviations from selling title mix distributions, and weekly distributions is minimized for each of the plurality of deals that are under delivering subject to an additional lower bound on the under delivery value.

34 Claims, 10 Drawing Sheets

(51) Int. Cl.
  *H04N 21/254* (2011.01)
  *H04N 21/2668* (2011.01)
  *H04N 21/258* (2011.01)
  *H04N 21/25* (2011.01)
  *H04N 21/81* (2011.01)

(52) U.S. Cl.
  CPC ....... *G06Q 30/0276* (2013.01); *H04N 21/251* (2013.01); *H04N 21/254* (2013.01); *H04N 21/25883* (2013.01); *H04N 21/2668* (2013.01); *H04N 21/812* (2013.01)

(56) References Cited

U.S. PATENT DOCUMENTS

| | | | |
|---|---|---|---|
| 8,401,897 | B1 | 3/2013 | Chatterjee |
| 8,516,515 | B2* | 8/2013 | Zigmond ............... G06Q 30/02 725/19 |
| 8,544,036 | B2 | 9/2013 | Bollapragada et al. |
| 8,973,023 | B1 | 3/2015 | Rao et al. |
| 9,147,198 | B2* | 9/2015 | Emans ............... H04N 21/2543 |
| 9,396,180 | B1 | 7/2016 | Salvador et al. |
| 9,652,510 | B1 | 5/2017 | Huang et al. |
| 9,668,002 | B1 | 5/2017 | Baron et al. |
| 10,219,048 | B2 | 2/2019 | Kunisetty et al. |
| 2003/0188308 | A1 | 10/2003 | Kizuka |
| 2005/0171897 | A1 | 8/2005 | Forsythe et al. |
| 2006/0253323 | A1 | 11/2006 | Phan et al. |
| 2006/0259455 | A1 | 11/2006 | Anderson et al. |
| 2007/0033623 | A1 | 2/2007 | Fredrickson et al. |
| 2007/0083885 | A1 | 4/2007 | Harding |
| 2007/0156525 | A1 | 7/2007 | Grouf et al. |
| 2007/0204310 | A1 | 8/2007 | Hua et al. |
| 2007/0239536 | A1* | 10/2007 | Bollapragada ..... G06Q 30/0264 705/14.61 |
| 2007/0288979 | A1 | 12/2007 | Yen |
| 2008/0189178 | A1 | 8/2008 | Schepers et al. |
| 2008/0189734 | A1 | 8/2008 | Schepers et al. |
| 2008/0201188 | A1 | 8/2008 | Heyman et al. |
| 2008/0250447 | A1 | 10/2008 | Rowe et al. |
| 2008/0263578 | A1 | 10/2008 | Bayer et al. |
| 2008/0263583 | A1 | 10/2008 | Heath |
| 2009/0006145 | A1 | 1/2009 | Duggal et al. |
| 2009/0070211 | A1 | 3/2009 | Gonen |
| 2009/0106082 | A1 | 4/2009 | Senti et al. |
| 2009/0144168 | A1* | 6/2009 | Grouf ................... G06F 16/438 705/26.1 |
| 2009/0150224 | A1 | 6/2009 | Lu et al. |
| 2009/0254932 | A1 | 10/2009 | Wang et al. |
| 2009/0276317 | A1 | 11/2009 | Dixon et al. |
| 2010/0023408 | A1 | 1/2010 | Neill |
| 2010/0042496 | A1 | 2/2010 | Wang et al. |
| 2010/0088719 | A1 | 4/2010 | Hawkins et al. |
| 2010/0146542 | A1 | 6/2010 | Weihs et al. |
| 2011/0078740 | A1 | 3/2011 | Bolyukh et al. |
| 2011/0093343 | A1 | 4/2011 | Hatami-Hanza |
| 2011/0119136 | A1 | 5/2011 | Eldreth et al. |
| 2011/0161162 | A1 | 6/2011 | Ketchum |
| 2011/0288907 | A1 | 11/2011 | Harvey et al. |
| 2012/0042338 | A1 | 2/2012 | Kitts et al. |
| 2012/0167125 | A1 | 6/2012 | Grubb |
| 2012/0191541 | A1* | 7/2012 | Yang .................. G06Q 30/0277 705/14.53 |
| 2013/0097629 | A1 | 4/2013 | Popescu et al. |
| 2013/0166395 | A1* | 6/2013 | Vassilvitskii ...... G06Q 30/0244 705/14.73 |
| 2013/0205339 | A1 | 8/2013 | Haberman et al. |
| 2013/0219427 | A1 | 8/2013 | Zundel et al. |
| 2013/0254787 | A1 | 9/2013 | Cox et al. |
| 2014/0006118 | A1 | 1/2014 | Charania |
| 2014/0046661 | A1 | 2/2014 | Bruner |
| 2014/0074591 | A1* | 3/2014 | Allen ................. G06Q 30/0244 705/14.43 |
| 2014/0082660 | A1 | 3/2014 | Zhang et al. |
| 2014/0109123 | A1 | 4/2014 | Balakrishnan et al. |
| 2014/0143032 | A1* | 5/2014 | Tomlin ............... G06Q 30/0241 705/14.4 |
| 2015/0039395 | A1 | 2/2015 | Denslow, III et al. |
| 2015/0089540 | A1* | 3/2015 | Kitts ................ H04N 21/25891 725/35 |
| 2015/0143404 | A1 | 5/2015 | Byers |
| 2015/0186403 | A1 | 7/2015 | Srivastava et al. |
| 2015/0269632 | A1 | 9/2015 | Ledwich et al. |
| 2015/0319510 | A1 | 11/2015 | Dellahy et al. |
| 2015/0348091 | A1 | 12/2015 | Haberman et al. |
| 2015/0365735 | A1 | 12/2015 | Kunisetty et al. |
| 2015/0373387 | A1 | 12/2015 | Chaar et al. |
| 2016/0037197 | A1 | 2/2016 | Kitts et al. |
| 2016/0117718 | A1 | 4/2016 | Hood et al. |
| 2016/0246765 | A1 | 8/2016 | Hundemer |
| 2016/0357362 | A1 | 12/2016 | Gauci et al. |
| 2020/0004743 | A1 | 1/2020 | Huang et al. |

FOREIGN PATENT DOCUMENTS

| | | | | |
|---|---|---|---|---|
| WO | WO2000051335 | A2 * | 8/2000 | ............. G06Q 30/04 |
| WO | 2001007985 | A2 | 2/2001 | |
| WO | 2006097826 | A2 | 9/2006 | |

OTHER PUBLICATIONS

Notice of Allowance in U.S. Appl. No. 14/842,799 dated Apr. 17, 2018.
Notice of Allowance in U.S. Appl. No. 14/842,799 dated Jun. 15, 2018.
Notice of Allowance in U.S. Appl. No. 14/842,799 dated May 10, 2018.
Notice of Allowance in U.S. Appl. No. 14/930,586 dated May 18, 2018.
Notice of Allowance in U.S. Appl. No. 14/930,586 dated May 2, 2018.
Notice of Allowance in U.S. Appl. No. 14/930,586 dated May 24, 2018.
Office Action in U.S. Appl. No. 14/842,808 dated Mar. 21, 2018.
Araman, V., Popescu, I., 2010. Media revenue management with audience uncertainty: Balancing upfront and spot market sales. Manufacturing & Service Opera-tions Management 2 (12), 190-212.
Bertsimas, D., Tsitsiklis, J., 1997. Introduction to Linear Optimization. Athena Scientific, Belmont, Massachusetts.
Bollapragada, S., Bussieck, M., Mallik, S., 2004. Scheduling commercial videotapes in broadcast television. Operations Research 52 (5), 679-689.
Bollapragada, S., Cheng, H., Phillips, M., Scholes, M., Gibbs, T., Humphreville, M., 2002. Nbc's optimization systems increase its revenues and productivity. Interfaces 32 (1), 47-60.
Bollapragada, S., Garbiras, M., 2004. Scheduling commercials on broadcast television. Operations Research 52 (3), 337-345.
Danaher, P., Dagger, T., 2012. Using a nested logit model to forecast television ratings. International Journal of Forecasting 28 (3), 607-622.
Danaher, P., Dagger, T., Smith, M., 2011. Forecasting television ratings. International Journal of Forecasting 27 (4), 1215-1240.
Horen, J., 1980. Scheduling of network television programs. Management Science 26 (4), 354-370.
Reddy, S., Aronson, J., Stam, A., 1998. Spot: Scheduling programs optimaly for television. Management Science 44 (1), 83-102.
International Search Report and the Written Opinion of the International Searching Authority, or the Declaration, in International application No. PCT/US12/59857, dated Jan. 4, 2013. (11 pages).
Corrected Notice of Allowance in U.S. Appl. No. 14/930,586 dated Aug. 1, 2018.
Corrected Notice of Allowance in U.S. Appl. No. 14/930,586 dated Jul. 3, 2018.
Final Office Action in U.S. Appl. No. 14/842,808 dated Sep. 10, 2018.
Non-Final Office Action in U.S. Appl. No. 14/930,599 dated Aug. 28, 2018.

(56) References Cited

OTHER PUBLICATIONS

Non-Final Office Action in U.S. Appl. No. 15/865,716 dated Jul. 23, 2018.
Non-Final Office Action for U.S. Appl. No. 14/842,808 dated May 31, 2019.
Advisory Action for U.S. Appl. No. 14/930,559 dated May 6, 2019.
Corrected Notice of Allowance for U.S. Appl. No. 16/026,422 dated May 14, 2019.
Notice of Allowance for U.S. Appl. No. 16/026,422 dated May 28, 2019.
Final Office Action in U.S. Appl. No. 14/930,559 dated Feb. 25, 2019.
Final Office Action in U.S. Appl. No. 15/865,716 dated Mar. 5, 2019.
Non-Final Office Action in U.S. Appl. No. 15/621,147 dated Jan. 15, 2019.
Non-Final Office Action in U.S. Appl. No. 15/621,151 dated Jan. 15, 2019.
Non-Final Office Action in U.S. Appl. No. 16/026,422 dated Jan. 22, 2019.
Notice of Allowance in U.S. Appl. No. 16/026,422 dated Mar. 15, 2019.
Corrected Notice of Allowance for U.S. Appl. No. 16/026,422 dated Aug. 22, 2019.
Non-Final Office Action for U.S. Appl. No. 14/930,559 dated Aug. 22, 2019.
Advisory Action for U.S. Appl. No. 15/865,716 dated Jun. 21, 2019.
Corrected Notice of Allowance in U.S. Appl. No. 16/026,422 dated Jun. 10, 2019.
Final Office Action for U.S. Appl. No. 15/621,151 dated Jul. 16, 2019.
Final Office Action for U.S. Appl. No. 15/621,147 dated Jul. 29, 2019.
Final Office Action for U.S. Appl. No. 14/930,559 dated Feb. 7, 2020.
Non-Final Office Action for U.S. Appl. No. 15/621,147 dated Mar. 6, 2020.
Non-Final Office Action for U.S. Appl. No. 15/621,151 dated Feb. 6, 2020.
Notice of Allowance for U.S. Appl. No. 15/865,716 dated Apr. 6, 2020.
Corrected Notice of Allowance for U.S. Appl. No. 15/865,716 dated Aug. 28, 2020.
Final Office Action for U.S. Appl. No. 15/621,147 dated Sep. 4, 2020.
Final Office Action for U.S. Appl. No. 15/621,151 dated Aug. 7, 2020.
Non-Final Office Action for U.S. Appl. No. 14/842,808 dated Jun. 12, 2020.
Non-Final Office Action for U.S. Appl. No. 14/930,559 dated Aug. 21, 2020.
Corrected Notice of Allowance for U.S. Appl. No. 15/865,716 dated Oct. 7, 2020.
Bollaparagda et al., "Managing On-Air Ad Inventory in Broadcast Television," IIE transactions 40.12 (2008), pp. 1107-1123.
Final Office Action for U.S. Appl. No. 16/895,304 dated Aug. 17, 2021.
Non-Final Office Action in U.S. Appl. No. 15/621,151 dated Sep. 16, 2021.
Notice of Allowance for U.S. Appl. No. 15/621,147 dated Nov. 15, 2021.
Notice of Allowance for U.S. Appl. No. 14/842,808 dated Jan. 19, 2021.
Notice of Allowance for U.S. Appl. No. 14/930,559 dated Feb. 16, 2021.
Supplemental Notice of Allowance for U.S. Appl. No. 14/930,559 dated Mar. 17, 2021.
Non-Final Office Action for U.S. Appl. No. 16/895,304 dated Apr. 27, 2021.
Supplemental Notice of Allowance for U.S. Appl. No. 14/842,808 dated Apr. 21, 2021.
Supplemental Notice of Allowance for U.S. Appl. No. 14/842,808 dated Jun. 10, 2021.
Supplemental Notice of Allowance for U.S. Appl. No. 14/930,559 dated May 19, 2021.
Advisory Action for U.S. Appl. No. 15/621,151 dated Oct. 3, 2019.
Advisory Action for U.S. Appl. No. 15/621,147 dated Oct. 21, 2019.
Corrected Notice of Allowance for U.S. Appl. No. 16/026,422 dated Oct. 30, 2019.
Final Office Action for U.S. Appl. No. 14/842,808 dated Dec. 12, 2019.
Corrected Notice of Allowance for U.S. Appl. No. 15/621,147 dated Nov. 26, 2021.
Corrected Notice of Allowance for U.S. Appl. No. 15/621,147 dated Feb. 10, 2022.
Corrected Notice of Allowance for U.S. Appl. No. 15/621,147 dated Nov. 24, 2021.
Non-Final Office Action for U.S. Appl. No. 16/895,304 dated Jan. 18, 2022.
Notice of Allowance for U.S. Appl. No. 15/621,151 dated Apr. 5, 2022.

* cited by examiner

1

ALLOCATION OF UNDER DELIVERY UNITS UTILIZING AN OPTIMIZATION FRAMEWORK

CROSS-REFERENCE TO RELATED APPLICATIONS/INCORPORATION BY REFERENCE

This application makes reference to:
U.S. application Ser. No. 14/842,808, which was filed on Sep. 1, 2015; and
U.S. application Ser. No. 14/930,586, which was filed on Nov. 2, 2015.

Each of the above referenced patent application is hereby incorporated herein by reference in its entirety.

FIELD OF TECHNOLOGY

Certain embodiments of the disclosure relate to reducing liability incurred due to deficiencies in the audience that have been guaranteed to advertisers. More specifically, certain embodiments of the disclosure relate to a method and system for allocation of under delivery units utilizing an optimization framework.

BACKGROUND

Most broadcasting and cable networks in the United States are advertisement-based. As such, their business is the delivery of impressions or audiences to advertisers. A network provider (network operator) enters into deals with advertisers in which the network provider is liable for a total guaranteed impressions specified in the deal. The network provider has to monitor the projected number of impressions throughout the entire flight of the deal, and when the projected number of impressions falls short of the guaranteed impressions, the network provider has to allocate additional unpaid units in order to meet the liability for the deal. These unpaid units are known as audience deficiency units, make good units, or under delivery (UD) units, which are generally referred to in the art as UD units.

Typically, hundreds of deals are allocated under delivery units each broadcast quarter. Traditionally, under delivery allocations were manually performed near the beginning of a quarter. Planners performed the under delivery allocations one deal at a time trying to balance business goals such as generating the most value out of the under delivery inventory reserve against customer requirements such as selling title mix and weekly distribution of allocated units. Deals were prioritized based on their index of projected delivered units to guaranteed units, focusing first on deals with lower indices. This was a highly laborious process that would take several days, even weeks, to complete and involved a fair amount of rework due to the complex nature of the under delivery allocation problem.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for allocation of under delivery units utilizing an optimization framework, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
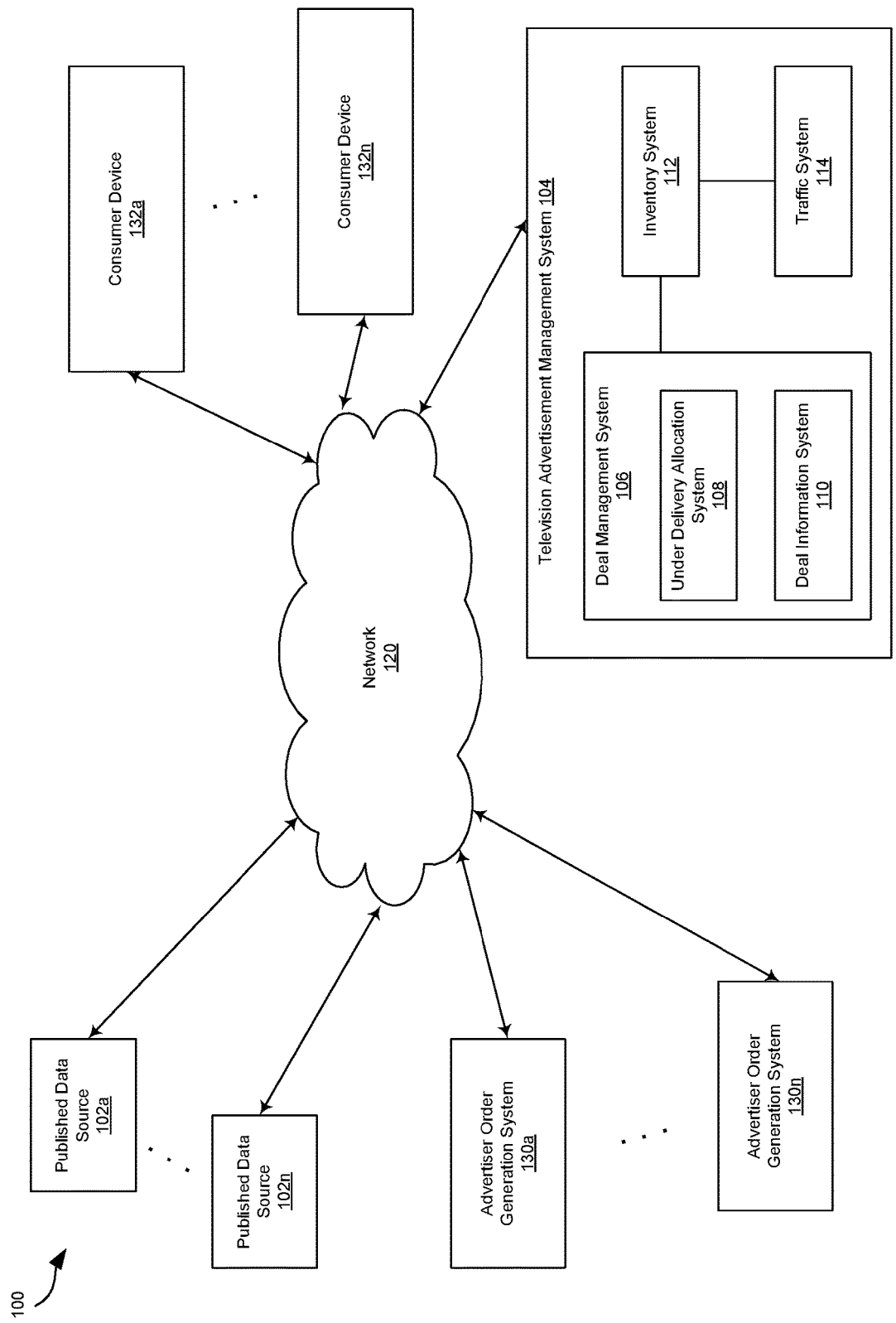
FIG. 1A is a block diagram that illustrates an exemplary system for providing allocation of audience deficiency units utilizing an optimization framework, in accordance with an exemplary embodiment of the disclosure.

Certain embodiments of the disclosure may be found in a method and system for allocation of under delivery units utilizing an optimization framework. Various embodiments of the disclosure provide a method and system that simplifies the under delivery allocation process, and makes optimal use of available inventory by concurrently allocating units across all deals. Various embodiments of the disclosure provide an optimization framework for under delivery units allocations which includes a multistage optimization engine that allocates the under delivery units across hundreds of deals while providing planners with the ability to run different scenarios and choose an allocation that best meets their needs. In accordance with various embodiments of the disclosure, a television advertising management system that handles a plurality of deals for a plurality of advertiser, determines which of the plurality of deals have a guaranteed audience, and are under delivering, and allocates reserve under delivery units to each of the plurality of deals that are under delivering to bring each of the plurality of deals that are under delivering to corresponding attainable lower targets while honoring corresponding deal constraints. Determining which of the plurality of deals have a guaranteed audience, and are under delivering includes determining, for each of the plurality of deals that have the guaranteed audience, the guaranteed audience, a gross sum of delivered audience spots that have aired, and a gross sum of estimated audience for spots that have not aired. Determining which of the plurality of deals have a guaranteed audience, and are under delivering further includes determining, for each of the plurality of deals that have the guaranteed audience, whether the sum of the gross sum of delivered audience spots that have aired, and the gross sum of estimated audience for spots that have not aired is less than the guaranteed audience. Determining which of the plurality of deals have a guaranteed audience, and are under delivering further includes filtering the plurality of deals based on criteria comprising, for example, at least a deal index, a monetary value of the deal, whether a deal is an aged deal, and whether a deal is a hiatus deal. In accordance with an embodiment of the disclosure, an under delivery value is maximized such that the attainable lower targets are met, while honoring corresponding deal constraints to provide an allocation solution, and a total penalty from deviations from selling title mix distributions, and weekly distributions is minimized for each of the plurality of deals that are under delivering subject to an additional lower bound on the under delivery value. The under delivery value may be maximized up to corresponding attainable upper targets such that the attainable lower targets are met, while honoring corresponding deal constraints to provide the allocation solution. The additional lower bound on the under delivery value may represent a total percentage of the maximum under delivery value that could be attained, and is computed by determining a percentage to be given up to attain selling title mix distributions, and weekly distributions that are closer to requirements of corresponding advertisers. Minimizing the total penalty from deviations may include adjusting the allocation solution such that the attainable targets, and percentage of the maximized under delivery value are met, and minimizing the deviations from the selling title mix distributions, and weekly distributions while honoring the corresponding deal constraints. Under delivery deal reserves may be generated based on the allocation solution, and under delivery orders may be generated based on the under delivery deal reserves. Under delivery spots may be scheduled based on the generated under delivery orders. A deal index for each of the plurality of deals that have a guaranteed audience, and are under delivering may be adjusted based on the scheduling of the under delivery spots.

In general, the broadcast year in the United States starts in late September/early October. Network providers typically announce their programming schedules for the new broadcast year about mid-May. Throughout this document, the terms broadcast provider or broadcast operator, and network provider or network operator may be utilized interchangeably. These announcements are shortly after followed by an intensive sales period known as the upfront market, in which networks sell around 60 to 80% of their commercial airtime. The upfront market represents the first selling wave of units in a new broadcast year for broadcast or cable networks, and usually occurs around mid-May after the new fall schedules have been announced, and presented to major advertisers. The remaining unsold commercial airtime is typically sold at higher rates throughout the broadcast year in what is known as the scatter market. The scatter market represents the selling of commercial airtime that remains after the upfront market has concluded.

Independently of the market type, network providers and advertisers, which are usually represented by advertiser agencies, may go for a few rounds of negotiations in which details of a sales proposal are ironed out. The sales proposal specifies the flighting dates, a total budget, cost per thousand impressions (CPM), quarterly impression distribution, selling title mix, spot length mix (proportion of 15-second spots, 30-second spots, etc.), a primary demographic that the advertiser is trying to reach (for instance F25-54, which stands for 25 to 54 year-old females), and a guaranteed audience level in that target demographic. The flighting dates represent the date range in which the spots will air. Additionally, weekly distribution goals may be specified, and in instances where weekly distribution goals are not specified, equitable distribution across weeks is typically expected. A selling title is an interval of programming time that a network provider utilizes to sell commercial airtime, it may comprise a particular show (Dallas, Cougar Town, etc.) or a block or time (Daytime—8:00 AM to 3:00 PM, Overnight-12:00 midnight to 6:00 AM, etc.). In some cases, the term daypart may be utilized as an alternative name for a selling title, but in other cases a daypart may be an aggregation of selling titles.

Once the proposal has been accepted by both parties, the proposal becomes a deal, and the network provider is liable for the total guaranteed impressions specified in the deal subject to various constraints. A media deal (deal) between an advertiser and a broadcast or cable network provider (network provider or network operator) generally specifies flighting dates, total budget, CPM, quarterly impression distribution, selling title mix, spot length mix, weekly distribution goals, primary demographic, ratecard type, and a guaranteed audience level in the target demographic. A deal starts as a proposal and becomes a deal when all terms are agreeable to both parties—advertiser, and network provider. Deal stewardship includes monitoring the performance of the deal and managing deal liability by the network provider. When the projected number of impressions throughout the entire flight of the deal falls short of the guaranteed impressions, additional unpaid units have to be allocated by the network provider to meet the liability for the deal. The impression liability of a deal is the difference between the guaranteed impressions and the total delivered impressions. While negative liability provides no additional revenue to the network provider, positive liability represents a financial commitment that must be met by the network provider. The liability is usually projected during the flighting of a deal, and additional unpaid units or under delivery units may be allocated to the advertiser to reduce the expected liability.

The under delivery units are given to an advertiser to reduce the expected liability for a given deal. Ratecards are the metrics of audience in different target demos, and there are different classifications of what constitutes valid audience for a specific deal. These classifications are referred to as ratecard types. Exemplary ratecard types include live (average number of people watching a particular show when it airs, including both commercial airtime and programming), ACM3 (average audience watching only commercial airtime either live or within 3 days of airing via DVR systems), and ACM7 (same as ACM3 but with 7 days of delayed viewing).

Program audience levels are uncertain and may be challenging to forecast. Program audience levels may depend on a number of factors that include time-dependent attributes such as time of the year, day of the week, and time of the day, as well as program-dependent attributes such as show genre, lead-in, and competing shows on other networks. Furthermore, while network providers are liable for unmet guaranteed impressions, the network providers do not receive any additional benefits for delivering impressions beyond the guaranteed levels. Therefore, it is desirable for network providers to closely monitor and manage their allocations of under delivery units in order to minimize their liability without exceeding guaranteed impressions. The allocation of under delivery units is performed in a dynamic environment in which the unexpected performance of a program, either higher or lower than expected, changes the under delivery units allocation priorities.

Media Revenue Management Process

The media revenue management process involves the planning and control of several interrelated components, but due to its organizational structures and technical constraints, as well as industry practice, it lends itself to a hierarchical planning approach that involves strategic, tactical, and operational decisions.

At the strategic level, network providers decide what shows to air in the upcoming broadcast year and when to air them. A programming schedule defines an aggregate capacity of non-programming airtime that is available for commercial spots, promos, filler spots, under delivery units, and so on. Commercial airtime is usually sold in terms of 30-second spots. Although other spot lengths are possible (such as 15-seconds or 60-second spots), negotiations on rates and unit distribution across selling titles and weeks are usually performed on equivalized 30-second units, which are generally referred to as EQ30s. As part of the strategic level, network providers also balance upfront versus scatter inventory allocation and create proposals for the upfront sales.

At the tactical level, network providers face a few planning problems that may be typically addressed quarterly and include scatter sales, distribution of branded units, and allocation of under delivery units. The commercial airtime that is not sold during upfront is sold throughout the broadcast year in either scatter or opportunistic sales. Scatter sales are performed throughout the year, and involve deals that last a few weeks as opposed to lasting an entire broadcast year. Scatter units are usually sold for higher rates than their corresponding upfront units. The distribution of branded units involves breaking down the units purchased by large advertisers into smaller branded orders that must meet certain budget and/or impression distribution conditions across selling titles, weekly distributions, spot lengths, and so on. The allocation of under delivery units involves determining what additional unpaid units should be allocated to deals that have a guaranteed audience level, but are expected to under perform.

At the operational level, network providers face opportunistic sales and daily/weekly scheduling problems involving commercial spots and promos. Opportunistic or filler sales are the sale of distressed inventory just before airing. These usually involve units in selling titles that are under performing or deals that air in time periods that may have a low sell-out rate, for example, overnight (midnight to 5:00 AM). Individual commercials, which may include upfront and scatter spots, under delivery units, and filler units, need to be scheduled in programming breaks honoring a number of constraints that include association constraints, product conflicts, time separation guarantees, specific positions during a break, and so on. Promos are typically scheduled separately following a distinct set of constraints while attempting to maximize the total gross rating points that will be delivered to the different promotional campaigns due to the showing of promos.

The Under Delivery Allocation Problem

Advertisers may be classified by industry category in which the advertiser falls, which is commonly referred to as a conflict code (for example, telecommunications, retailers, automotive, fast food restaurants, movies, etc.), and are usually trying to reach a specific demographic which they believe is most likely to consume their products. For example, an advertiser of male grooming products might target males 18+. Deals may have performance guarantees on the total audience or impressions in the advertiser's target demographic. The total audience delivered to a deal is the gross sum of impressions that fall into the target demographic regardless of duplication of impressions. Although the specific ratecard type (metrics of audience in different target demos) to be applied to a deal is determined during the sales process, specific audience levels are only forecasts at that time. The actual audience levels are provided by media rating agencies after the commercials have aired. In the United States, Nielsen Media Research (Nielsen) is the standard for broadcast and cable ratings. A deal is considered to be under performing if the gross sum of delivered audiences from spots that have aired plus the gross sum of estimated audiences from spots that haven't aired falls short of the guaranteed audience.

A network provider honors any unmet guaranteed impressions even though the network provider does not receive an additional revenue from over delivering impressions to a deal. As a result, impression estimates used in sales negotiations are usually positively biased (i.e., higher than expected) to hedge against deal over delivery by increasing the likelihood on under delivery. An inventory management system 142 (FIG. 2A) may be utilized to handle setting up of inventory reserves for under delivery allocations. Although the decision of optimally distributing non-programming airtime into commercial airtime, promo time, and under delivery time may be a complex problem, it may be assumed that this distribution has already been decided, and that the under delivery inventory reserves are fixed.

Each broadcast quarter, the network provider or operator allocates under delivery units across hundreds of under performing deals. A proposal of under delivery allocations specifies the number of units (in EQ30s) that will be allotted to a deal for specific combinations of selling titles and weeks. Although selling titles exhibit demographic differences in their viewership, which could be exploited to maximize the liability reduction of an under delivery inventory reserve, deals have several characteristics that may directly impact the allocation of under delivery units. In particular, under delivery allocations should attain a similar selling title unit distribution than that of their corresponding deal paid units, and they should also be distributed equitably across weeks in which paid units are in flight. The value of a particular selling title to a particular advertiser varies such that each deal specifies a selling title mix that reflects the specific preferences of the advertiser. Therefore, advertisers want to receive a comparable selling title mix in their under delivery units. If a particular show is oversold, an advertiser might accept a different selling title with similar demographics, or it might choose to wait until the same selling title is available at a later time. Some advertisers may also face time sensitivity to air their spots and/or they might be interested in advertising only during specific times of the year, for instance tax preparation services during tax season and retailers advertising toys during holiday season. This puts additional burden or constraints in the priorities for the under delivery allocations. Indeed, one of the challenges faced in under delivery allocation is how to handle aged deals, which are deals that are out of flight and therefore have no more paid units scheduled to air, but have also not yet met their guaranteed audience. Surrogate selling titles may sometimes be used to allocate under delivery units for aged deals or other deals whose selling titles might no longer exist or might not air for a while. In some rare occasions, advertisers with aged deals might decide together with the network provider to no longer receive any additional spots on their plan and instead receive a write-off equivalent to the value of the unmet impressions. In some instances, this write-off might also be accompanied with a penalty depending on the conditions of the deal.

FIG. 1A is a block diagram that illustrates an exemplary system for providing allocation of audience deficiency units utilizing an optimization framework, in accordance with an exemplary embodiment of the disclosure. Referring to FIG. 1A, the system 100, comprises a television advertisement management system 104 that is communicatively coupled to published data sources 102a, . . . , 102n, and advertiser order generation systems 130a, . . . , 130n, via a network 120. The consumer devices 132a, . . . , 132n are communicatively coupled to the network 120. The television advertisement management system 104 may comprise a deal management system 106, an inventory system 112, and a traffic system 114. The deal management system 106 may comprise under delivery allocation system 108, and deal information system 110.

The television advertisement management system 104 may comprise suitable logic, circuitry, and interfaces that may be operable to execute code that handles multicasting of content comprising audio, video, and/or data. The television advertisement management system 104 may be operated by a broadcasting company, which may be referred to as a broadcast provider or operator, or a network provider or operator. The broadcast provider may handle a single channel or a plurality of channels, or one or more networks. The broadcast provider may be operable to multicast content via one or more channels, for example, traditional over-the-air broadcast channels, cable television networks, satellite communication networks, the Internet, and/or other content delivery networks (CDN).

The television advertisement management system 104 may be operable to electronically receive, via the communication network 120, deals comprising advertisers orders from the plurality of advertiser order generation systems 130a, . . . , 130n. The traffic system 114, which may comprise one or more spot scheduler solvers may be operable to receive an advertiser's order to place one or more spots into one or more commercial breaks. The advertiser's order comprises airing constraints and placement requirements corresponding to the one or more spots, and each of the one or more commercial breaks comprises a plurality of inventory buckets. The airing constraints corresponding to each of the one or more spots comprise, for example, one or more of network constraints, selling title constraints, inventory type constraints, allowable date and time constraints, and advertiser conflict constraints. The placement requirements corresponding to each of the one or more spots comprise, for example, one or more of associative constraints, position constraints, time separation constraints, franchise and/or title exclusion constraints, and spot pinning constraints. The associative constraints define the positioning of any two or more spots relative to each other within the same one of the at least one of the plurality of inventory buckets or in adjacent inventory buckets. The position constraints define the positioning of any one spot in one of the at least one of the plurality of inventory buckets and/or in a commercial break.

The network 120 may be any kind of network, or a combination of various networks, and it is shown illustrating the communication that may occur between the advertiser order generation systems 130a, . . . , 130n and the television advertisement scheduling system 100. For example, the network 120 may comprise one or more of a cable television network, the Internet, a satellite communication network, a wide area network (WAN), a medium area network (MAN), and a local area network (LAN).

The advertiser order generation systems 130a, . . . , 130n may place orders with the broadcasting company that include information about the type of spots to be broadcast, the number of spots to be broadcast, and when should the spots be aired. In this regard, the advertiser order generation systems 130a, . . . , 130n may electronically book spots to a selling title (ST), and within the selling title there are constraints. The advertiser order generation systems 130a, . . . , 130n may provide multiple orders, which need not be submitted at the same time. Therefore, the traffic system 114 may continuously receive orders with new or additional spots to be placed and may need to update any previously determined commercial break schedule to accommodate the constraints and requirements of those spots already placed and of the new spots being received.

Each of the plurality of published data sources 102a, . . . , 102n may be coupled to one or more television networks and may comprise suitable logic, circuitry, and interfaces that may be operable to execute code that provides actual audiences for programs that were aired. As illustrated in FIG. 1A, the plurality of published data sources 102a, . . . , 102n are coupled to the television advertisement management system 104 via the network 120. An exemplary published data source may be Nielsen Media Research, which is commonly referred to as Nielsen.

The inventory system 112 may comprise suitable logic, circuitry, and interfaces that may be operable to execute code that handles the under delivery reserves. In this regard, the inventory system 112 may handle the setup of under delivery reserves, and establish the under deliver inventory for the allocation of under delivery units based on an optimal under deliver allocation solution that may be generated by the under delivery allocation system 108.

The traffic system 114 may comprise suitable logic, circuitry, and interfaces that may be operable to execute code that receives cleared and/or modified orders and queue them for spot schedule solving to determine placement of spots. In this regard, the traffic system 114 is operable to receive advertisers orders from the plurality of advertiser order generation systems 130*a*, . . . , 130*n*, and place one or more spots into one or more commercial breaks.

The under delivery allocation system 108 may comprise suitable logic, circuitry, and interfaces that may be operable to execute code that handles the allocation of under delivery units utilizing an optimization framework. In one embodiment of the disclosure, the under delivery allocation system 108 enables planners to run different scenarios in which the planners may change the values of deal parameters, for example, a minimum target and a maximum target, or different sets of deals and obtain an optimal under delivery allocation for those parameters. The under delivery allocation system 108 utilizes a multistage and/or multiphase optimization such as, for example, a three-phase optimization to optimally allocate the under delivery units and generate an allocation solution. It should readily be understood that the various embodiments of the disclosure are not limited to a three-phase optimization. The under delivery allocation system 108 interfaces with various hardware components in the television advertisement management system 104 and is operable to receive input from a planner, via, for example, a user terminal (illustrated in FIG. 2A). In this regard, for example, the under delivery allocation system 108 interfaces with the deal information system 110, and the inventory system 112.

The deal information system 110 may comprise suitable logic, circuitry, and interfaces that may be operable to execute code that handles processing of deals and the comprises information for all deals.

In operation, the planner may utilize the under delivery allocation system 108 to create one or more under delivery plans or scenarios. The planner may search for deals that meet certain criteria such as deals having a certain liability based, for example, on whether each of the deals is indexing below a certain threshold value. The planner may also search for deals having a certain liability and a certain conflict code, which identifies the industry category for the deal. The searching for deals to be added to a plan or scenario based on criteria such as deal index, conflict code, aged deals may be referred to as filtering. The under delivery allocation system 108 enables the planner to run a plurality of plans or scenarios, and compare the resulting under delivery allocation solutions across the plurality of plans or scenarios. Based on the comparison, the planner may select a particular under delivery allocation solution and the under delivery allocation system 108 may be operable to commit the selected under delivery allocation solution to the inventory system 112. The inventory system 112 may be operable to partition the liability inventory reserve into individual deal reserves with their corresponding audience deficiency units based on the selected under delivery allocation solution. In this regard, the inventory system 112 creates the under delivery deal reserves based on the allocation solution, and generates the under delivery orders based on the under delivery deal reserves. The inventory system 112 may communicate the under delivery orders to the traffic system 114 for spot scheduling.

Figure 1B:
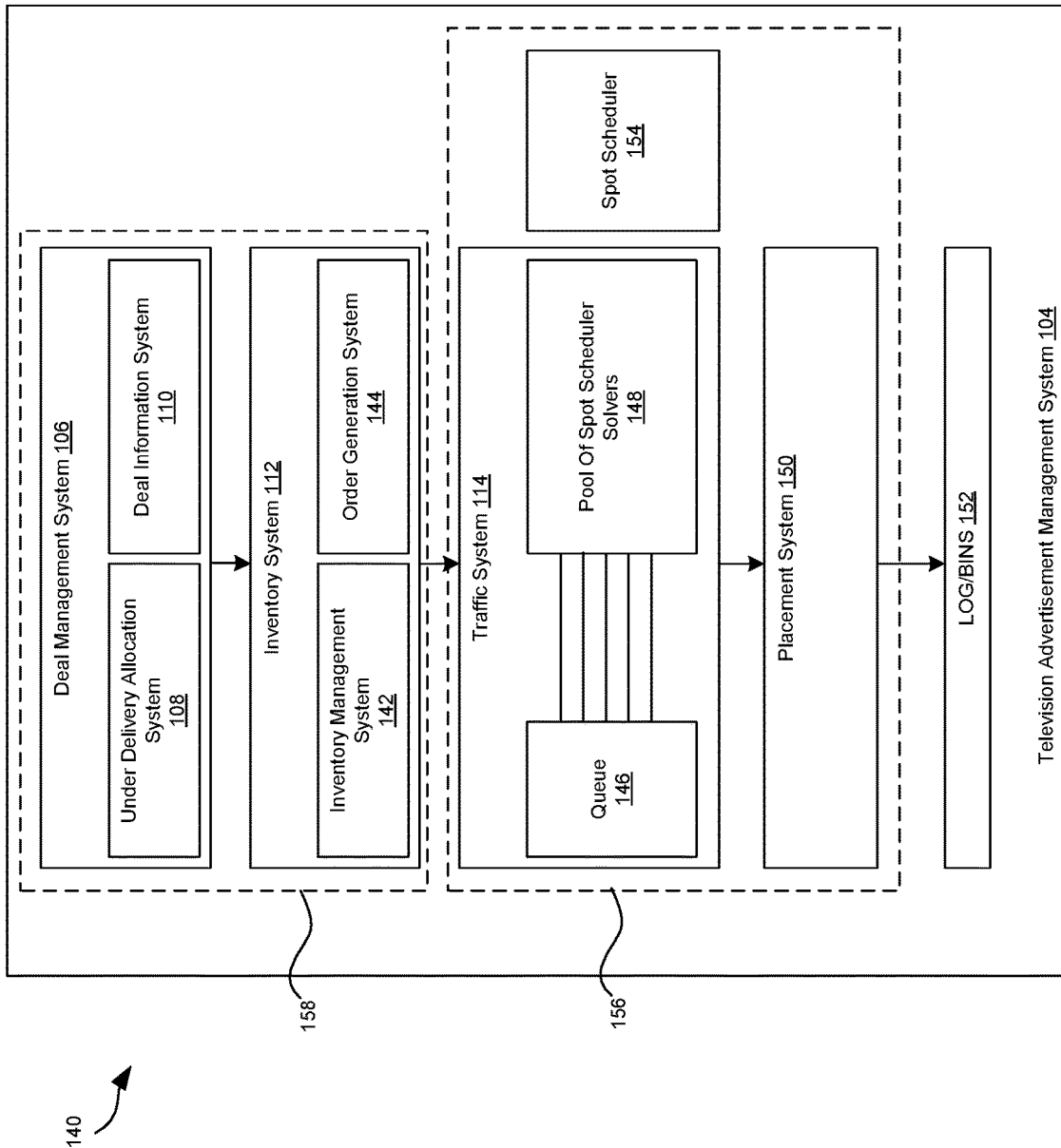
FIG. 1B is a block diagram that illustrates an exemplary television advertisement management system for providing allocation of audience deficiency units utilizing an optimization framework, in accordance with an exemplary embodiment of the disclosure.

FIG. 1B is a block diagram that illustrates an exemplary television advertisement management system for providing allocation of audience deficiency units utilizing an optimization framework, in accordance with an exemplary embodiment of the disclosure. Referring to FIG. 1B, the advertisement management system 104 may comprise a deal management system 106, an inventory system 112, traffic system 114, placement system 150, LOG/BINS 152, and spot scheduler 154. The deal management system 106 comprises the under delivery allocation system 108, and the deal information system 110. The inventory system 112 comprises inventory management system 142, and order generation system 144. In some embodiments of the disclosure, the deal management system 106 and the inventory system 114 may be integrated to form an integrated system 158. In some embodiments of the disclosure, as shown, the deal management system 106 may be distinct from the inventory system 112. In some embodiments of the disclosure, the spot scheduler 154 may be integrated as part of the traffic system 114 to form an integrated system 156. In some embodiments of the disclosure, the spot scheduler 154 may be located separately from the traffic system 114.

The under delivery allocation system 108 may comprise suitable logic, circuitry, and interfaces that may be operable to execute code that handles the allocation of under delivery units utilizing an optimization framework. The under delivery allocation system 108 interfaces with various hardware components in the television advertisement management system 104, for example, the deal information system 110, and the inventory system 112, and is operable to receive input from a planner, via, for example, a user terminal 206. The under delivery allocation system 108 is operable to utilize an objective function to maximize the value of the under delivery inventory reserve, that is, maximize the liability reduction, while honoring advertiser requirements and operational constraints. In this regard, the under delivery allocation system 108 may be operable to allocate under delivery units to bring all deals meeting certain criteria beyond their lower targets if possible, or determine the maximum deal index that may be attained for each of the deals. The under delivery allocation system 108 then maximizes a resulting under delivery value subject to the (possibly) new lower targets which may become hard constraints. The under delivery allocation system 108 enables planners to run different scenarios in which planners are allowed to change parameters such as the values of the minimum and maximum targets for different sets of deals and criteria, and obtain an optimal under delivery allocation for those scenarios and their corresponding parameters and criteria.

The deal information system 110 may comprise suitable logic, circuitry, and interfaces that may be operable to execute code that handles processing of deals and comprises information for all deals. The under delivery allocation system 108 may be operable to acquire or receive information for one or more deals from the deal information system 110, and utilize the received information to generate an optimal allocation of under delivery units across a plurality of deals.

The inventory management system 142 may comprise suitable logic, circuitry, and interfaces that may be operable to execute code that handles the under delivery reserves for the under delivery allocation system 108. The inventory management system 142 may be operable to handle the under delivery reserves for deals and clear orders based on available inventory. With respect to the handling of the under delivery reserves for deals, the inventory management system 142 may be operable to partition the liability inventory reserve into individual deal reserves with their corresponding audience deficiency units based on a selected under delivery allocation solution. Accordingly, the inventory management system 142 may create the under delivery deal reserves based on the allocation solution. The inventory management system 142 may also be operable to clear orders, for example, on a first come first serve (FCFS) basis. When an order is received by the inventory management system 142, the order may specify that x units be placed in selling title week A, y units be placed in selling title week B, and z units be placed in selling title week C, for example. Since there may be multiple bookings occurring, the inventory management system 142 ensures the availability of the inventory for booking the required units for the order. In some embodiments of the disclosure, the inventory management system 142 may be operable to change the attributes associated with an order that has already cleared inventory, and may, for example, add one or more units for an order to the inventory, or delete one or more units from inventory.

The order generation system 144 is operable to create or generate under delivery orders based on the under delivery deal reserves that were created by the inventory management system 142. The inventory system 112 may communicate the under delivery orders to the traffic system 114 for spot schedule solving.

The traffic system 114 may comprise suitable logic, circuitry, and interfaces that may be operable to execute code for receiving cleared and/or modified orders and queue them for assignment for spot schedule solving. The cleared and/or modified orders may be received from the order generation system 114 in the inventory system 112. In this regard, the cleared and/or modified orders may comprise under delivery orders that have been created or generated based on under delivery deal reserves. The traffic system 114 may comprise a hardware queue 146, and a pool of spot scheduler solvers 148. The hardware queue 146 may be operable to queue the cleared and/or modified orders, which includes the under delivery orders, that have been processed by the traffic system 114. The traffic system 114 may assign the cleared and/or modified orders that are queued in the queue 146 to an available spot scheduler solver in the pool of spot scheduler solvers 148 for solving placements of the one or more spots.

The spot scheduler 154 may comprise suitable logic, circuitry, and interfaces that may be operable to execute code that may be operable to place one or more spots into one or more commercial breaks based on the solved placement of the one or more spots.

The placement system 150 may comprise suitable logic, circuitry, and interfaces that may be operable to execute code that places the spots from the traffic system 114 on the logs/bins 155 based on the results from one or more of the spot scheduler solvers 148.

Figure 1C:
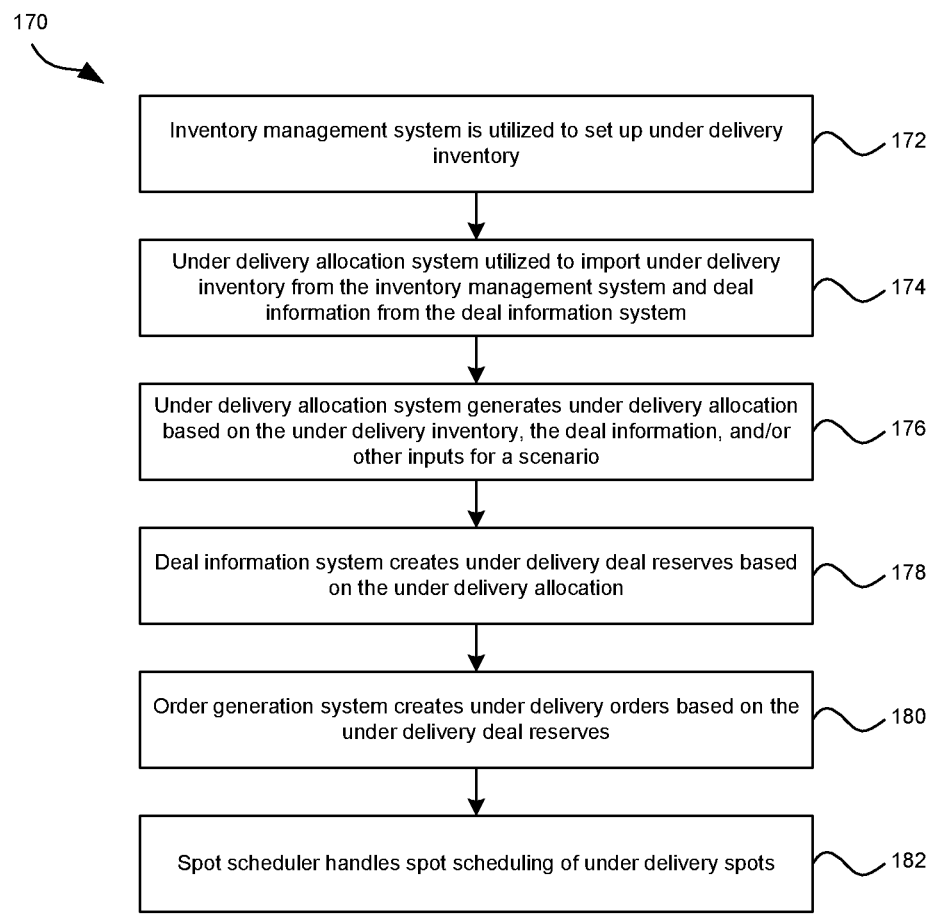
FIG. 1C is a flow chart illustrating high-level operation of the television advertisement management system of FIG. 1B, in accordance with an exemplary embodiment of the disclosure.

FIG. 1C is a flow chart illustrating high-level operation of the television advertisement management system of FIG. 1B, in accordance with an exemplary embodiment of the disclosure. Referring to FIG. 1C, there are shown a flow chart 170 comprising exemplary operations 172 through 182. At 172, the inventory management system 112 may be utilized to set up under delivery inventory. At 174, the under delivery allocation system 108 may be utilized to import under delivery inventory from the inventory management system 112 and deal information from the deal information system 110. At 176, the under delivery allocation system 108 may be operable to generate under delivery allocation based on the under delivery inventory, the deal information, and/or other inputs for a scenario. At 178, the deal information system 110 creates the under delivery deal reserves based on the allocation solution. At 180, the order generation system 144 creates under delivery orders based on the under delivery deal reserves. At 182, the spot scheduler 154 may be operable to handle spot scheduling of the under delivery spots.

Figure 2A:
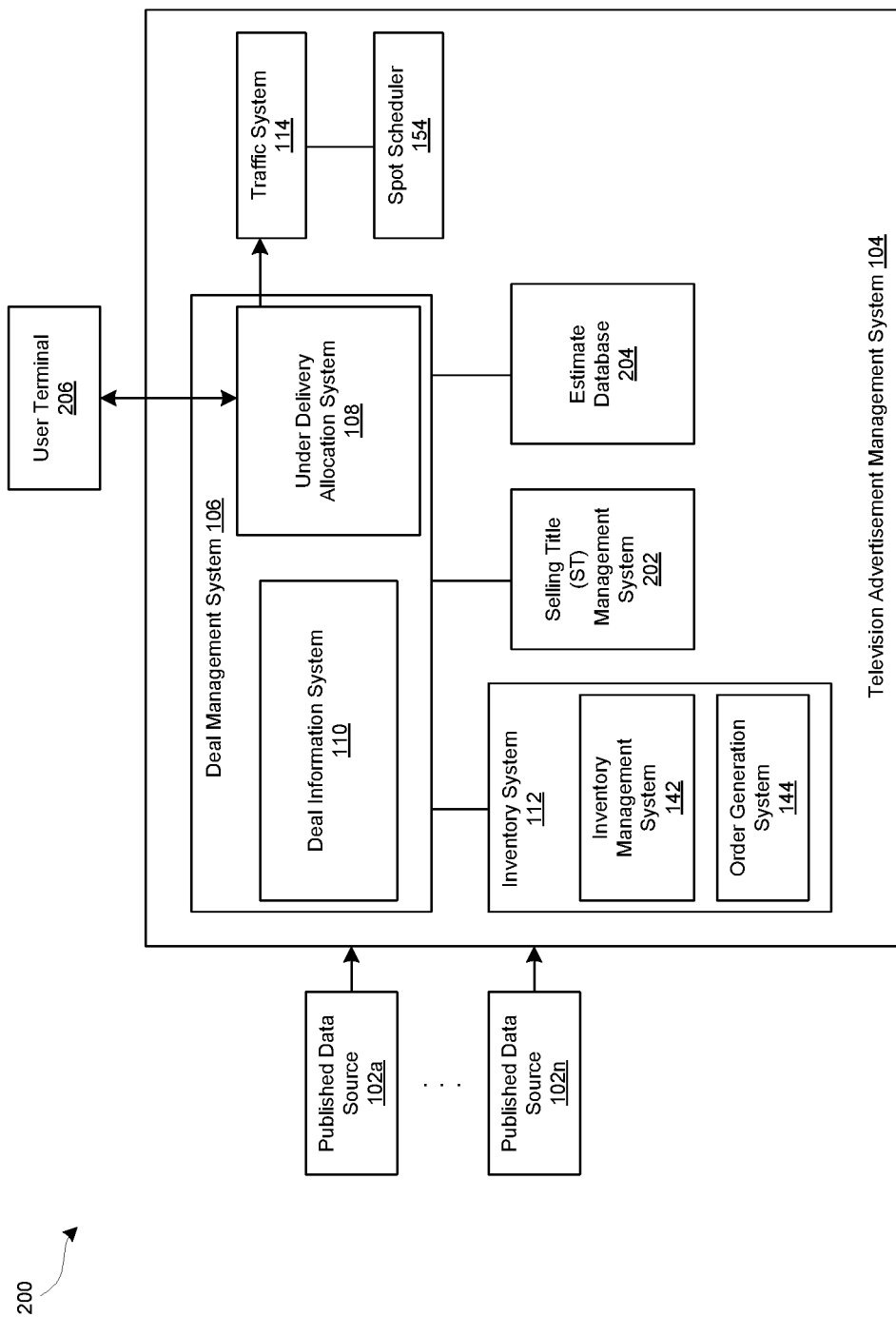
FIG. 2A is a block diagram that illustrates an exemplary television advertisement management system communicatively coupled to a user terminal for providing allocation of audience deficiency units utilizing an optimization framework, in accordance with an exemplary embodiment of the disclosure.

FIG. 2A is a block diagram that illustrates an exemplary television advertisement management system communicatively coupled to a user terminal for providing allocation of audience deficiency units utilizing an optimization framework, in accordance with an exemplary embodiment of the disclosure. Referring to FIG. 2A, the system 200 comprises a television advertisement management system 104, which is communicatively coupled to a user terminal 206. The television advertisement management system 104 comprises the deal management system 106, the inventory system 112, traffic system 114, spot scheduler 154, a selling title management system 202, and an estimate database 204. The deal management system 106 may comprise the deal information system 110, and the under deliver allocation system 108. The inventory system 112 may comprise the inventory management system 142, and the order generation system 144.

The user terminal 206, may comprise keypad, one or more displays, a speaker, a microphone, and/or a pointing device, which may enable a planner to interact with the television advertisement management system 104. For example, the user terminal 206 may enable a planner to configure and provide one or more inputs to the under delivery allocation system 108 in the television advertisement management system 104. The user terminal 206 may be operable to present one or more screen outputs or user interface that may enable a planner to enter and/or select parameters and/or deal information that may be utilized by the under delivery allocation system 108 to provide an optimal allocation of under delivery units across a plurality of deals.

The estimate database 204 may be utilized to store estimates such as estimates or projections of the audience for programs that will air.

The under delivery allocation system 108 is integrated within the television advertisement management system 104, and interfaces with the deal information system 110, the inventory system 112 that includes the inventory management system 142, and the order generation system 144, the traffic system 114, the selling title management system 202, and the estimate database 204. A planner may utilize the user terminal 206 to control the under delivery allocation system 108 to create one or more plans or scenarios throughout the broadcast quarter depending on the timing of their allocations. A planner may utilize the user terminal 206 to control the under delivery allocation system 108 to filter or search for liable deals of interest to add to the plan or scenario based on criteria such as whether a deal has a current deal index is below a certain threshold, whether the deal has a certain conflict code, and so on. The planner may utilize the user terminal 206 to control the under delivery allocation system 108 to set lower and upper targets for these deals based on different scenarios that they would like to evaluate.

In an exemplary scenario, the planners may be interested in prioritizing aged deals, so the planners might want to set their lower and upper targets more aggressive for this type of deals whereas set them more conservative for the rest of the deals. In a different exemplary scenario, it may be desirable for the planners to focus on deals that will soon be out of flight, or deals that belong to a certain conflict code, for example, department stores near Christmas time, and tax preparation services near tax filing deadline. In another exemplary scenario, it may be desirable for the planners to be more aggressive or more conservative with an adjustable parameter such as a "dial" that trades off liability value for a better unit spread. The adjustable dial parameter represents the total percentage of under delivery value that the planners are willing to forego to obtain a unit distribution that conforms much closer to the advertiser requirements. The under delivery allocation system 108 enables planners to run as many scenarios as desired and then provides comparison tools to compare the different under delivery allocation solutions across the scenarios. The planners may utilize the user terminal 206 to instruct the under delivery allocation system 108 to select an under delivery allocation solution. Once an under delivery allocation solution across the many scenarios has been selected, the planners may utilize the user terminal 206 to instruct the under delivery allocation system 108 to commit the selected under delivery allocation solution to the inventory system 112.

The inventory management system 142 in the inventory system 112 may be operable to apportion the liability inventory reserve into individual deal reserves with their corresponding under delivery units based on the selected under delivery allocation solution. The advertiser corresponding to the each of the individual deals may be notified of the selected under delivery allocation solution. Once the advertiser for the deal has found the under delivery unit allocation acceptable, the order generation system 144 may be operable to create the under delivery orders so that the explicit audience deficiency spots will be scheduled by the spot scheduler 154 on their specific selling titles and weeks.

Figure 2B:
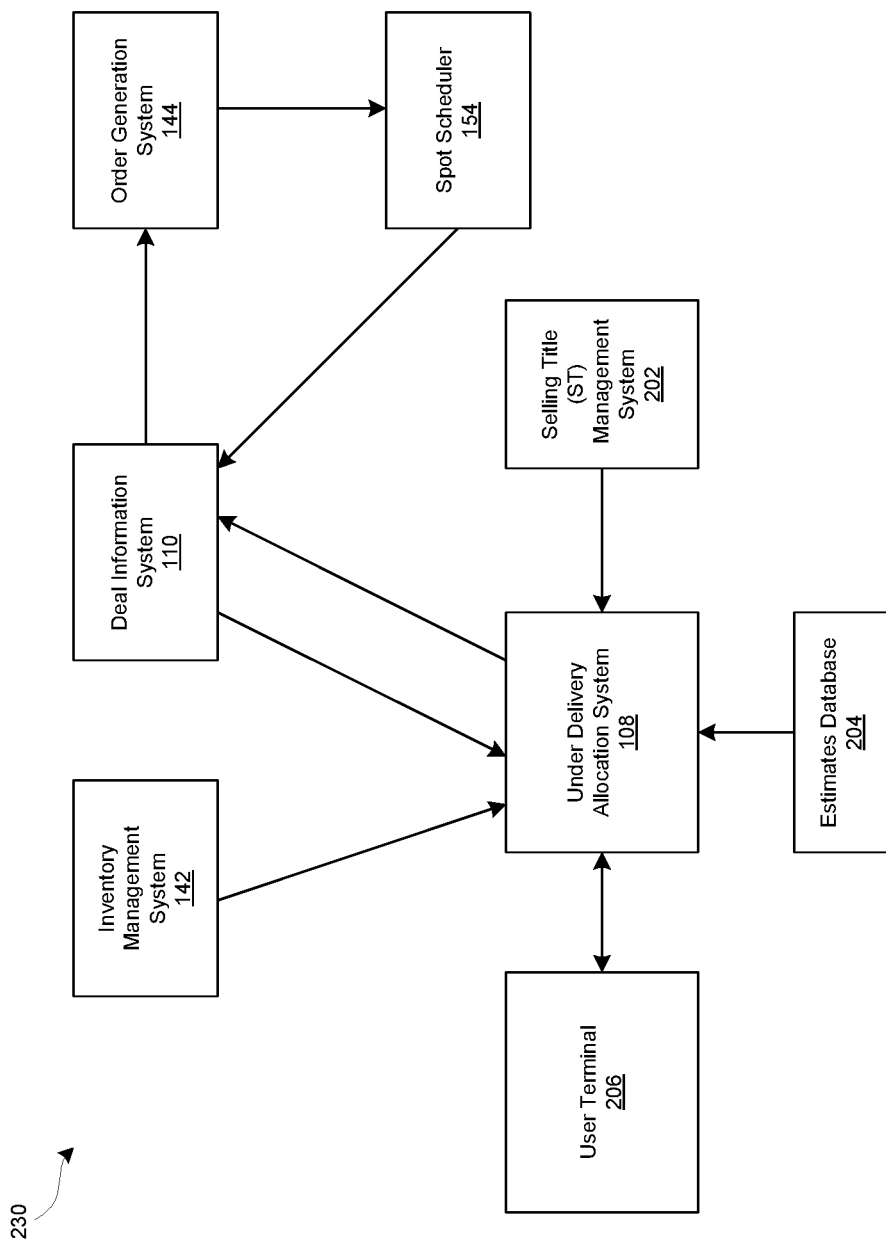
FIG. 2B is a block diagram that illustrates communication between the components in the exemplary television advertisement management system and user terminal of FIG. 2A, for providing allocation of audience deficiency units utilizing an optimization framework, in accordance with an exemplary embodiment of the disclosure.

FIG. 2B is a block diagram that illustrates communication between the components in the exemplary television advertisement management system and user terminal of FIG. 2A, for providing allocation of audience deficiency units utilizing an optimization framework, in accordance with an exemplary embodiment of the disclosure. Referring to FIG. 2B, there is shown the under delivery allocation system 108, which is communicatively coupled to the inventory management system 142, the deal information system 110, the selling title management system 202, the estimates database 204, and the user terminal 206. The deal information system 110 may be communicatively coupled to the order generation system 144, and the spot scheduler 154.

The under delivery allocation system 108 may be operable to receive and/or acquire a plurality of inputs from one or more of the inventory management system 142, the deal information system 110, the selling title management system 202, the estimates database 204, and the user terminal 206 in order to generate an optimal allocation of under delivery units across a plurality of deals for a network. At least a portion of the received inputs may be utilized as inputs to an objective function, which is utilized by the under delivery allocation system 108 to maximize the value of the under delivery inventory reserve while honoring advertiser requirements and operational constraints The under delivery allocation system 108 may be operable to receive input and/or parameters from the inventory management system 142 identifying inventory avails by selling title and week, category avails by selling title and week, and inventory caps and rules associated with the inventory. The inventory avails by selling title and week indicates the under delivery inventory coming from the initial under delivery reserves. The category avails by selling title and week indicates the maximum number of under delivery units that the under delivery allocation system 108 may allocate to a selling title and week across all deals. The inventory cap and rules indicates, for each deal, a maximum number of under delivery units that may be allocated within a given week or allocation period, or whether to count existing units towards the cap.

The under delivery allocation system 108 may be operable to receive input and/or parameters from the deal information for each of the deals from the deal information system 110. Exemplary deal information may comprise, for each deal, a deal number or other deal identifier, a description of the deal, a corresponding advertiser handling the deal, a deal reserve key, a current deal index, overall deal index, data indicating whether a deal is an aged deal that has no more paid spots, data indicating whether a deal is a hiatus deal that indicates that the advertiser does not want to have any units during a particular period (e.g. one or more weeks), data indicating the type of deal, data indicating a team for the deal, data indicating an agency, data indicating a product conflict, data indicating a ratecard type, data indicating primary demos, data indicating guaranteed demos, data indicating impressions (e.g. in thousands) that are being projected, data indicating the dollar amounts that are being projected, data indicating the flight including a start date and an end date, data indicating weeks left in the quarter, data indicating paid units, and data indicating the existing under delivery units. The planner may utilize the deal information to set the upper and lower targets. A deal primary demo, or target demo, is the main population segment that the advertiser is trying to reach with its commercial spots. The primary demo segment is considered the one most likely to consume the advertisers' products. A primary demo is specified with a gender (male, female, or people) and an age rage (18-49, 25-54, 60+, etc.).

The under delivery allocation system 108 may be operable to acquire inputs and/or parameters indicating estimates from the estimates database 204. The estimates include the forecasted delivery for the demos for each selling title and week.

The under delivery allocation system 108 may also be operable to acquire inputs and/or parameters indicating selling title package sets and rules, and selling title group sets (which are referred to as group sets) from the selling title management system 202. Selling titles of related shows are sometimes sold as a package to advertisers. Examples include shows that have several telecasts per week (premiere, repeat, and encore), and movies that air multiple times. The selling package sets and rules are groups of selling titles that each network identifies as a single entity, and includes related shows that are sold as a package to advertisers. Hence, if a unit is allocated to one selling title in the selling title package, then a unit will also have to be allocated to all of the other selling titles in the package. A selling title group set is a set of selling titles that are comparable in terms of audience composition and value (i.e., their price per spot is approximately the same). Selling titles may be used as surrogates for other selling titles in the same group when the original selling titles are no longer in flight or have no additional units available. The selling title group sets or group sets indicate where tradeoff may be made. Accordingly, if there is no inventory for a particular selling title, then corresponding inventory may be allocated from another selling title that is in the same group.

The under delivery allocation system 108 may be operable to acquire inputs and/or parameters from the user terminal 206. At least a portion of these inputs may be provided by a planner and may be referred to as user inputs. The inputs received from the user terminal 206 may comprise data identifying inventory caps and rules, deal targets, under delivery and spread priority (adjustable dial), package set and rules, group sets, allocation period, and filters on deals. The dial, which is adjustable, represents the total percentage of under delivery value that the planners are willing to forego to obtain a unit distribution that conforms much closer to the advertiser requirements. The deal targets may be specified by the planner and indicates the upper and lower targets. The under delivery and spread priority may be defined by the planner and indicates an amount that may be backed off from the maximum dollars in order to get a better spread ratio. The planner may utilize the filter on deals to search for deals that meet certain criteria and are to be added to a plan or scenario.

The under delivery allocation system 108 may be operable to generate an optimal allocation solution of under delivery units across a plurality of deals for a network based on the inputs and/or parameters that are received and/or acquired from the inventory management system 142, the deal information system 110, the selling title management system 202, the estimates database 204, and/or the user terminal 206. The optimal allocation solution of under delivery units across a plurality of deals for a network may be communicated to the deal information system 110. The deal information system 110 may be operable to generate under delivery deal reserves based on the optimal allocation solution of under delivery units across a plurality of deals for a network. The order generation system 144 may be operable to create under delivery orders based on the under delivery deal reserves generated by the deal information system 110. The under delivery orders may be communicated to the spot scheduler 154 for scheduling. The spot scheduler 154 may provide scheduling information to the deal information system 110. For example, the spot scheduler 154 may communicate information regarding the under delivery spots to the deal information system system 110 so that the deal information system 110 may update the pacing or indexing for each of the corresponding deals.

Figure 3:
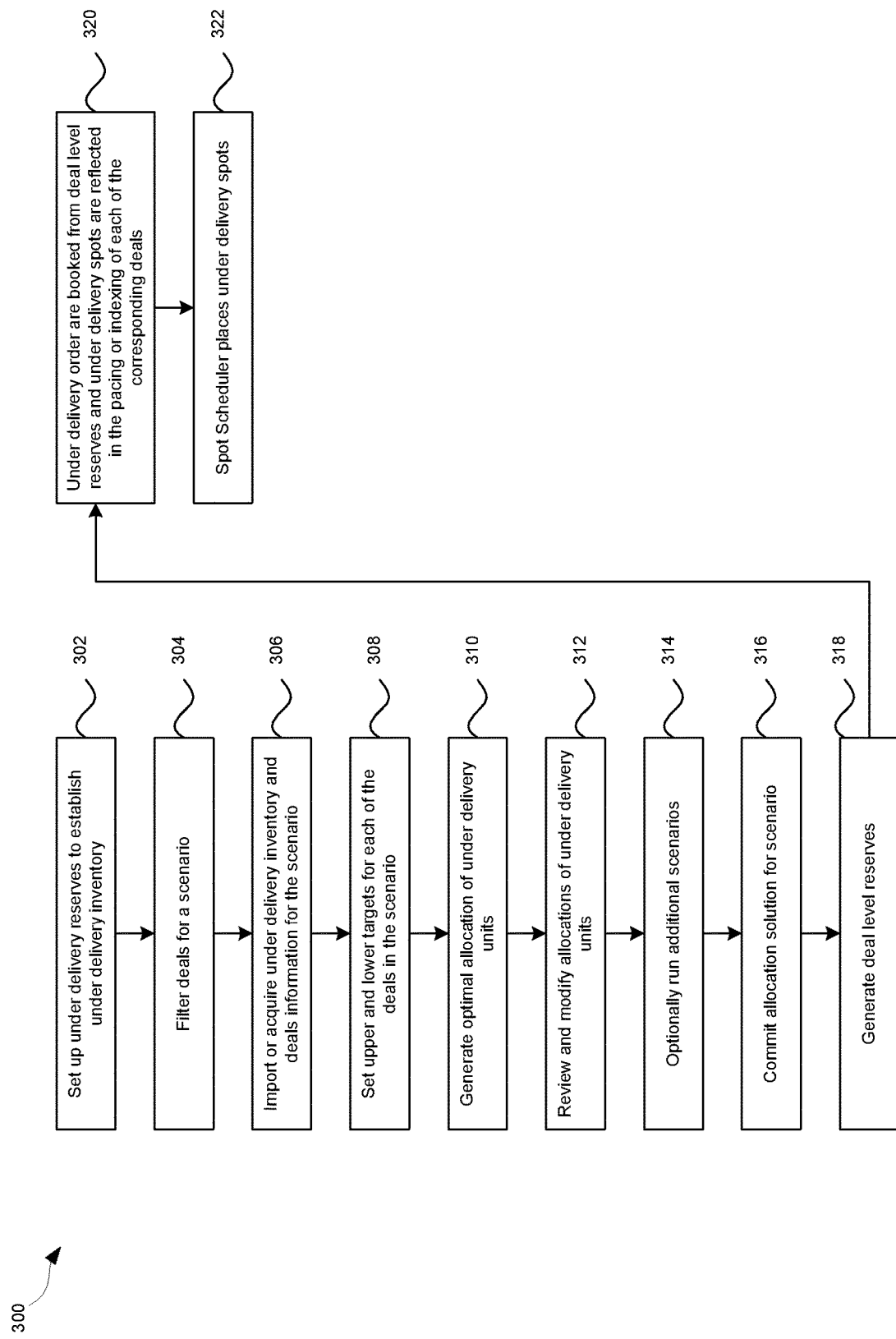
FIG. 3 is a flow chart that illustrates exemplary operations for providing allocation of under delivery units utilizing an optimization framework in a television advertisement management system, in accordance with an exemplary embodiment of the disclosure.

FIG. 3 is a flow chart that illustrates exemplary operations for providing allocation of under delivery units utilizing an optimization framework in a television advertisement management system, in accordance with an exemplary embodiment of the disclosure. Referring to FIG. 3, flow chart 300 includes exemplary operations 302 through 322.

At 302, set up under delivery reserves to establish under delivery inventory. At 304, filter deals for a scenario. A planner may utilize the user terminal 306 to indicate the criterial for the deals that will be included in the scenario. For example, one or more filters may be utilized to include deals having a particular selling title master, aged deals, and/or deals indexing below 98% in the scenario. At 306 import or acquire under delivery inventory and deals information for the scenario. At 308, set upper target and lower target for each of the deals in the scenario. In this regard, a planner may utilize the user terminal 206 to set the upper target and the lower target for each of the deals in the scenario based on the imported or acquired under delivery inventory and information for the deals. The under delivery inventory may be imported or acquired from the inventory management system 142, and the information for the deals may be imported or acquired from the deal information system 110.

At 310, generate optimal allocation of under delivery units. At 312, review and modify allocation of under delivery units. In this regard, the planner may utilize the user terminal 206 to review and modify the allocation of under delivery units generated at 310. The under delivery allocation system 108 may be operable to generate an optimal allocation solution. At 314, optionally run additional scenarios. At 316, the allocation solution for the scenario may be committed. In this regard, the planner may utilize the user terminal 206 to commit the optimal allocation of under delivery units or a modified version thereof. At 318, generate deal level reserves. The deal information system 110 is operable to generate the under delivery deal level reserves.

At 320, under delivery orders are booked from the generated under delivery deal level reserves, and under delivery spots are reflected in the pacing or indexing of each of the corresponding deals. At 322, the spot scheduler may place the under delivery spots Optimization Framework for Under Delivery Allocation In various embodiments of the disclosure, the under delivery allocation problem is modeled as a mathematical programming problem in which the main decision variables are the allocations of under delivery units (in EQ30s) to allowable combinations of deals, selling titles, and weeks. The objective function is to maximize the value of the under delivery inventory reserve (i.e., maximize the liability reduction) while honoring advertiser requirements and operational constraints. Exemplary constraints that limit under delivery allocations, may comprise airtime capacity constraints, deal index upper and lower targets, usage of surrogate selling titles, allocation of packaged selling titles, quantification of under delivery value, and selling title mix distribution and weekly distribution Exemplary airtime capacity constraints may comprise:
For every selling title and week, the total number of under delivery units allocated across all deals cannot exceed the available units on the reserve.
For every conflict code, selling title, and week, total number of under delivery units associated with that conflict code allocated across all deals cannot exceed the maximum number of units that can still be scheduled. This restriction prevents allocating an excessive number of units with the same conflict code (insurance, soft drinks, etc.) that could not be feasibly scheduled.
The number of units allocated to a specific deal, selling title, and week, cannot exceed a threshold that takes into account how many paid units and additional under delivery units for that advertiser are already assigned. This restriction prevents allocations that could later be infeasible to schedule due to spot time separation restrictions.

Exemplary deal index upper and lower targets may comprise:
For every deal, the projected deal index must not exceed its upper target. These constraints are necessary to prevent over allocating to profitable deals (deals whose liability reduction is more valuable than others).
For every deal, the projected deal index should exceed its lower target. These are soft constraints as the reserve might not contain enough units to guarantee that all deal indices can be brought within their desired range.
Feasible allocations in which a deal meets its lower target must dominate feasible allocations in which the deal does not meet its lower target. It may be difficult to enforce this constraint in a simple way because the lower target constraint is a soft constraint.

Exemplary usage of surrogate selling titles may comprise:
A deal can be assigned units on a selling title that is a surrogate of the original selling title appearing in the deal if and only if all available units of the original selling title have been exhausted. These constraints are important for aged deals for which the original selling titles may no longer exist, but are also relevant to substitute units across selling titles that are deemed similar in value to advertisers.

Exemplary allocation of packaged selling titles may comprise:
The number of units assigned to a given deal, selling title, and week must be equal for all the selling titles that were sold to that advertiser as a package, i.e., under delivery allocations should honor the same packaging constraints of the original deal.

Exemplary quantification of under delivery value may comprise:
  The value of all under delivery units assigned to a given deal is measured by the corresponding total impressions multiplied by the deal CPM that applies to that quarter. However, just as deals have an impression balance (measured by its impression index), they also have a dollar balance. Under delivery value for a given deal should only be quantified when it does not exceed the current dollar deficit for the corresponding deal.

Exemplary selling title mix distribution and weekly distribution may comprise:
  The distribution of under delivery units allocated to a given deal should closely match the distribution of paid units of the original deal.
  Under delivery units should only be allocated on weeks in which original paid units were purchased, i.e., no under delivery should be allocated on hiatus weeks for a given advertiser.
  The distribution of under delivery units allocated to a given deal should closely match the deal weekly weightings. If no weights are specified in the deal, the units should be distributed equitably across all weeks in which allocations are made.

Modeling the requirement that all deals should be allocated enough under delivery units so that their indices meet their lower targets would imply a complex optimization model because of the fact that this is a hard requirement only if all deals have enough units to meet that condition. This hard requirement specifies that priority should be given to allocating units to deals that have not yet met their lower targets, but if there are no units that can be allocated to a deal that has not met its lower target, then additional units may be given to deals that have already met their lower targets. Instead of attempting to incorporate all these requirements into a single complex operation, the under delivery allocation optimization framework performed by the under delivery allocation system 108 utilizes a hierarchical optimization approach comprising a plurality of phases. For example, in a first phase of the under delivery allocation optimization framework, the under delivery allocation system 108 may allocate units to bring all deals beyond their lower targets if possible (or determines the maximum index that can be attained for each deal), and in a second phase of the under delivery allocation optimization framework, the under delivery allocation system 108 may maximize a resulting UD value subject to the (possibly) new lower targets which become hard constraints.

Additionally, since the selling title ratio mix and weekly distribution constraints are soft constraints, they may be modeled as goals, and the deviation from these goals may be added as penalties in the objective function. Determining the right penalties that trade-off dollar value against deviation from distribution goals may be challenging. In addition, planners would like to have the ability to run different scenarios from which the effect of different emphasis on the selling title mix and weekly distribution may readily be seen in an effort to understand the impact that this would have on the reduction of under delivery value that is extracted from the under delivery reserve. Accordingly, the second phase of the under delivery allocation optimization framework may include two stages—a first stage, and a second stage. In the first stage of the second phase of the under delivery allocation optimization framework, the under delivery allocation system 108 may maximize the under delivery value that meets all conditions and the attainable lower targets computed in the first phase. In the second stage of the second phase of the under delivery allocation optimization framework, the under delivery allocation system 108 may minimize the total penalty from deviations from selling title mix distributions and weekly distributions subject to an additional lower bound on the under delivery value to be attained. The additional lower bound on the under delivery value may represent a total percentage of the maximum under delivery value that could be attained and is computed by determining a percentage to be given up to attain selling title mix distributions, and weekly distributions that are closer to requirements of corresponding advertisers. This additional lower bound has a parameter, which may be referred to as a "dial" that represents the total percentage of under delivery value that the planners are willing to forego to obtain a unit distribution that conforms much closer to the advertiser requirements. This parameter is intuitive to the planners, and enables the planners to run different scenarios or plans with different percentages until they find an allocation that they are confident will be amenable to advertisers without sacrificing too much under delivery value. As an example for illustrative purpose, assume the maximum under delivery units is 100, and the dial indicates that the planner is willing to give up 10% of that value (10% of 100=10), then the lower bound would be (100−10)=90, which means that the new allocation has to have a value of at least 90.

Figure 4:
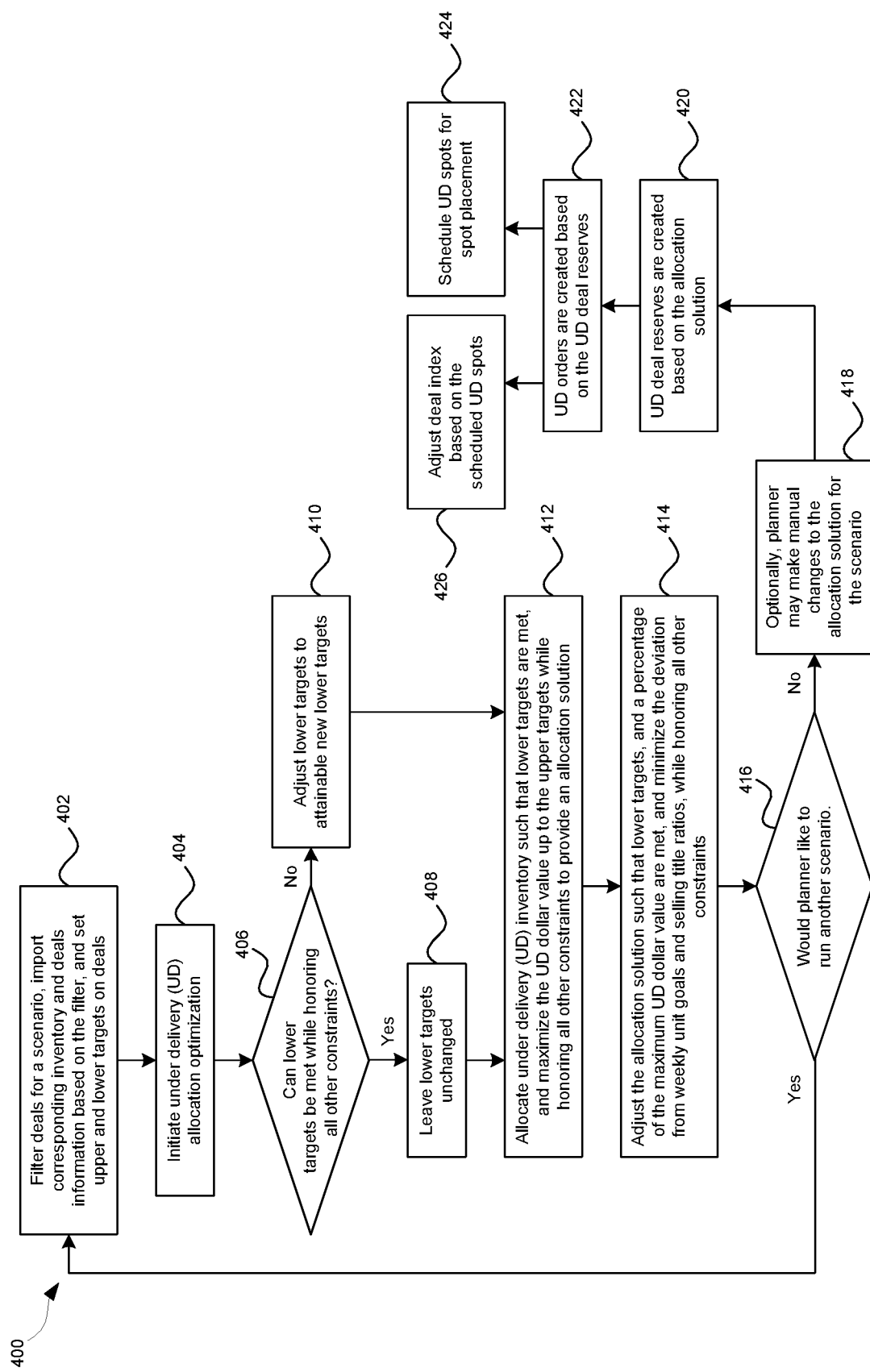
FIG. 4 is a flow chart that illustrates exemplary operations for providing allocation of under delivery units utilizing an optimization framework in a television advertisement management system, in accordance with an exemplary embodiment of the disclosure.

FIG. 4 is a flow chart that illustrates exemplary operations for providing allocation of under delivery units utilizing an optimization framework in a television advertisement management system, in accordance with an exemplary embodiment of the disclosure. Referring to FIG. 4, flow chart 400 includes exemplary operations 402 through 426 in flow chart 400.

At 402, filter deal for a scenario, import corresponding inventory and deals information based on the filter, and set upper and lower targets on the deals. In some embodiments of the disclosure, the under delivery allocation system 108 may be configured to filter the deal for a scenario and import the corresponding inventory and deals information. The under delivery allocation system 108 may also be configured to set the upper and lower targets on the deals in the scenario. At 404, initiate the under delivery allocation optimization. In this regard, the under delivery allocation system 108 may initiate the allocation of under delivery units utilizing the under delivery allocation optimization framework.

At 406, determine whether lower targets can be met while honoring all other constraints. If at 406, the lower targets cannot be met while honoring all other constraints, then at 410, adjust the lower targets to attainable new lower targets. If at 406, the lower targets can be met while honoring all other constraints, then at 408, leave the lower targets unchanged. Subsequent to 408, and 410, at 412, allocate under delivery inventory such that the lower targets (unchanged lower targets, or attainable new lower targets) are met and maximize the under deliver dollar value up to the upper targets while honoring all other constraints to provide an allocation solution. At 414, adjust the allocation solution such that lower targets, and a percentage of the maximum under delivery dollar value are met, and minimize the deviation from weekly unit goals and selling title ratios, while honoring all other constraints. At 416, determine whether planner would like to run another scenario. The under delivery allocation system 108 may be configured to handle operations 402, 404, 406, 408, 410, 412, 414, and 416.

If at 416 it is determined that the planner would like to run another scenario, the operation 402 is executed. If at 416 it is determined that the planner would not like to run another scenario, then optionally, at 418, the planner may make manual changes to the allocation solution for the scenario. Otherwise, at 420, under delivery deal reserves are created based on the allocation solution. In this regard, the deal information system 110 may be operable to create the under delivery deal reserves based on the allocation solution. At 422, under delivery orders are created based on the under delivery deal reserves. The order generation system 144 may be operable to create the under delivery orders based on the under delivery deal reserves. At 424, schedule under delivery spots for spot placement. The spot scheduler 154 may be operable to handle spot scheduling of the under delivery spots. At 426, adjust deal index based on the scheduled under delivery spots. The deal information system 110 may be operable to adjust the deal management index based on the scheduled under delivery spots.

Figure 5:
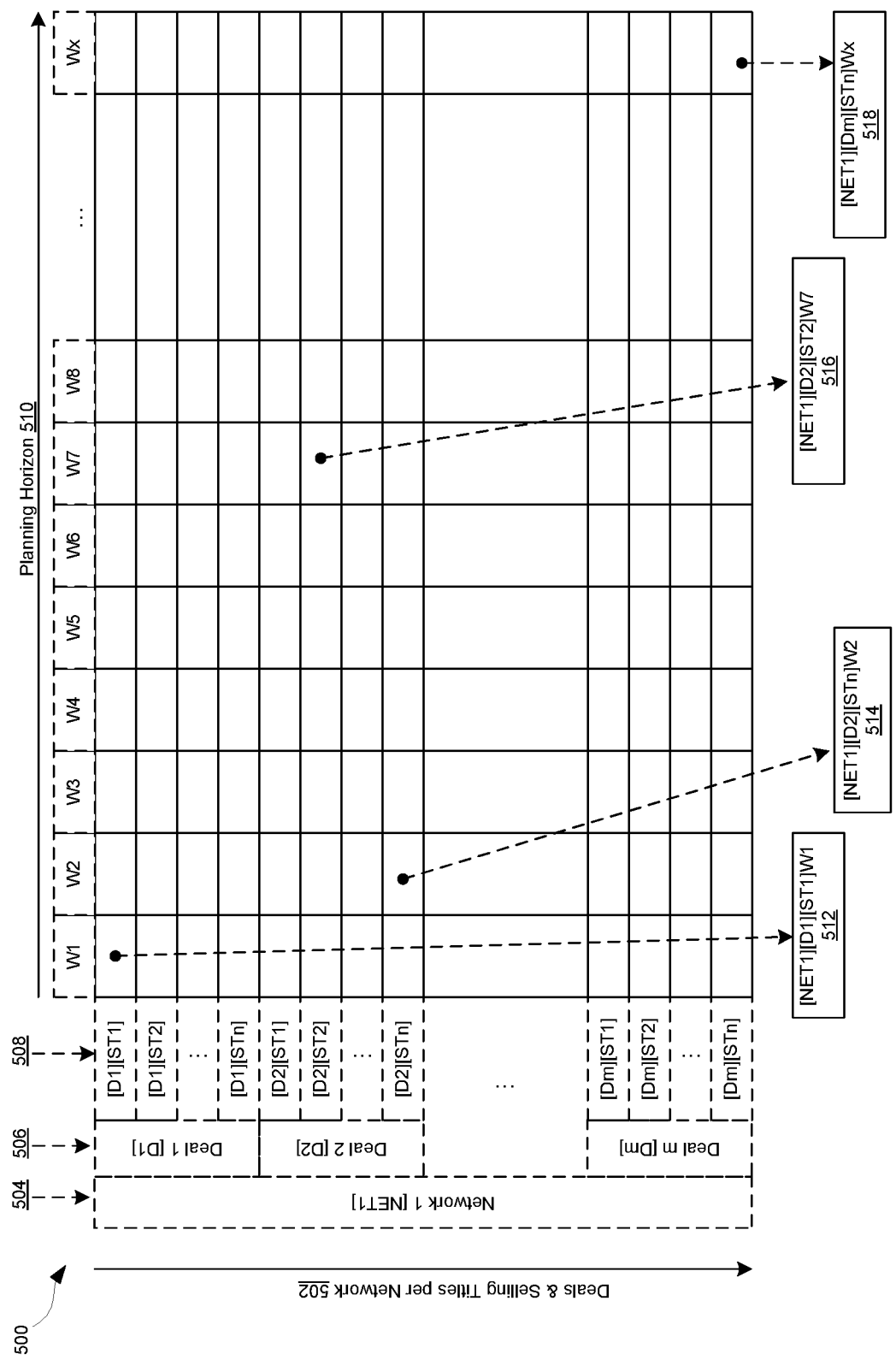
FIG. 5 is a high-level diagram that conceptually illustrates an exemplary allocation framework for allocating under delivery units across a network for a plurality of deals and selling titles and weeks, in accordance with an exemplary embodiment of the disclosure.

FIG. 5 is a high-level diagram that conceptually illustrates an exemplary allocation framework for allocating under delivery units across a network for a plurality of deals and selling titles and weeks, in accordance with an exemplary embodiment of the disclosure. Referring to FIG. 5, there is shown a grid 500 that may be utilized for generating an optimal allocation of under delivery units a network for a plurality of deals and selling titles and weeks. The grid 500 illustrates a mapping of all deals and selling titles per network 502 to the planning horizon 510, which is represented in weeks. FIG. 5 represents allocations of under delivery units (in EQ30s) to allowable combinations of deals, selling titles, and weeks for a network.

The network 504 is referenced as NET1. The grid 500 may be replicated to represent one or more other networks as needed.

The deals 506 are referenced as D1, . . . , Dm, where m is an integer that is greater than or equal to 1.

The selling titles (ST) 508 are referenced as ST1, . . . , STn, where n is an integer that is greater than or equal to 1. All the selling titles for network 1, deal 1 are referenced as [D1][ST1], . . . , [D1][STn]. All the selling titles for network 1, deal 2 are referenced as [D2][ST1], . . . , [D2][STn]. All the selling titles for network 1, deal m are referenced as [Dm][ST1], . . . , [Dm][STn].

The planning horizon 510 represents the allocation period in weeks. The weeks are referenced as W1, W2, . . . , Wx, where x is an integer greater than or equal to 1.

An under delivery allocation for network 1, deal 1, selling title 1, week 1, may be represented as [NET1][D1][ST1]W1, 512. An under delivery allocation for network 1, deal 2, selling title n, week 2, may be represented as [NET1][D2][STn]W2, 514. An under delivery allocation for network 1, deal 2, selling title 2, week 7, may be represented as [NET1][D2][ST2]W7, 516. An under delivery allocation for network 1, deal m, selling title n, week x, may be represented as [NET1][Dm][STn]Wx, 518.

Figure 6:
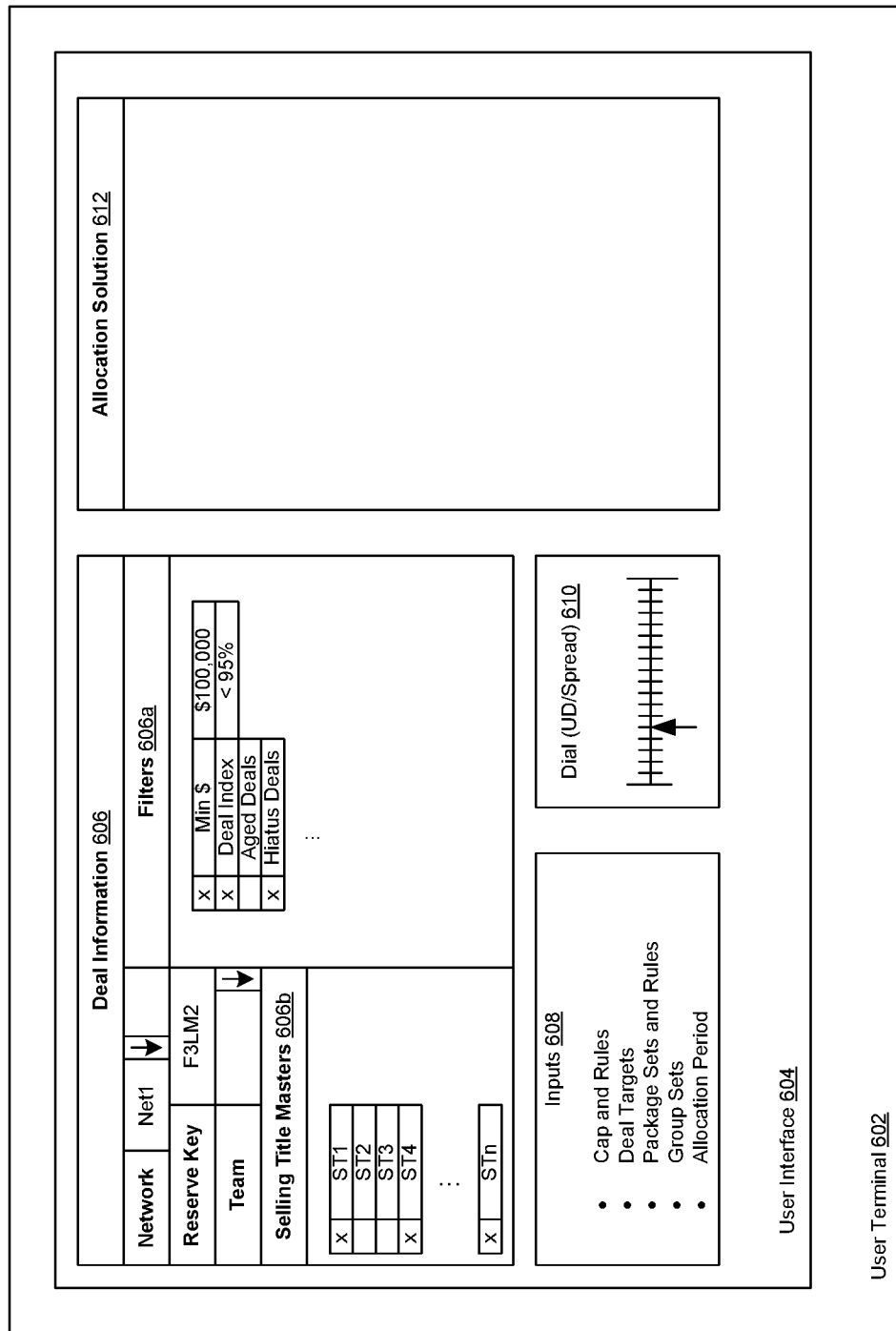
FIG. 6 is a diagram of an exemplary interface that may be presented on a user terminal and utilized by a planner to control operation of the under delivery allocation system for allocating under delivery units across a network for a plurality of deals and selling titles and weeks, in accordance with an exemplary embodiment of the disclosure.

FIG. 6 is a diagram of an exemplary interface that may be presented on a user terminal and utilized by a planner to control operation of the under delivery allocation system for allocating under delivery units across a network for a plurality of deals and selling titles and weeks, in accordance with an exemplary embodiment of the disclosure. Referring to FIG. 6, there is shown user terminal 602 presenting a user interface 604. The user interface 604 may include, for example, fields for specifying deal information 606, inputs 608, dial 610, and allocation solution 612.

The deal information field 601 may comprise fields for specifying a network, for example, network 1 (Net1), a reserve key, a team identifier, filters 606a, and selling title masters 606b. The filters 606a may enable selection and input of the dollar amount, and deal index, as well as aged deals, and hiatus deals when filtering deals for a scenario or plan. The selling title masters 606b may enable selection of the selling title for the deals in a scenario or plan.

The inputs field 608 may comprise, for example, user defined inputs such as fields for specifying cap and rules, deal targets, and allocation period, and input data coming from the other systems including package sets and rules, and group sets.

The dial 610 provide a selectable unit such as a percentage value, which indicates the percentage under delivery value that a planner may be willing to forego or give up in order to achieve a better spread or deviations from selling title mix distributions and weekly distributions that are closer to zero. In other words, the dial may represent a total percentage of under delivery value that the planners are willing to forego to obtain better selling title mix distributions and weekly distributions that conforms much closer to the advertiser's requirements. The spread represents the allocation of the under delivery units across selling titles and across weeks.

The optimal allocation solution for the under delivery units generated by the under delivery allocation system 108 may be presented in the allocation solution field 612. In some embodiments of the disclosure, the optimal allocation solution for the under delivery units generated by the under delivery allocation system 108 may be stored in memory.

The user interface 604 may enable information for a plurality of plans or scenarios to be entered and stored. In this regard, the under delivery allocation system may acquire the stored information and generate corresponding optimal allocation solutions for these scenarios or plans. The optimal allocation solutions for these scenarios or plans may be presented in the allocation solution field 612 on the user interface 604, or may be stored for subsequent presentation in the allocation solution field 612 on the user interface 604.

Figure 7:
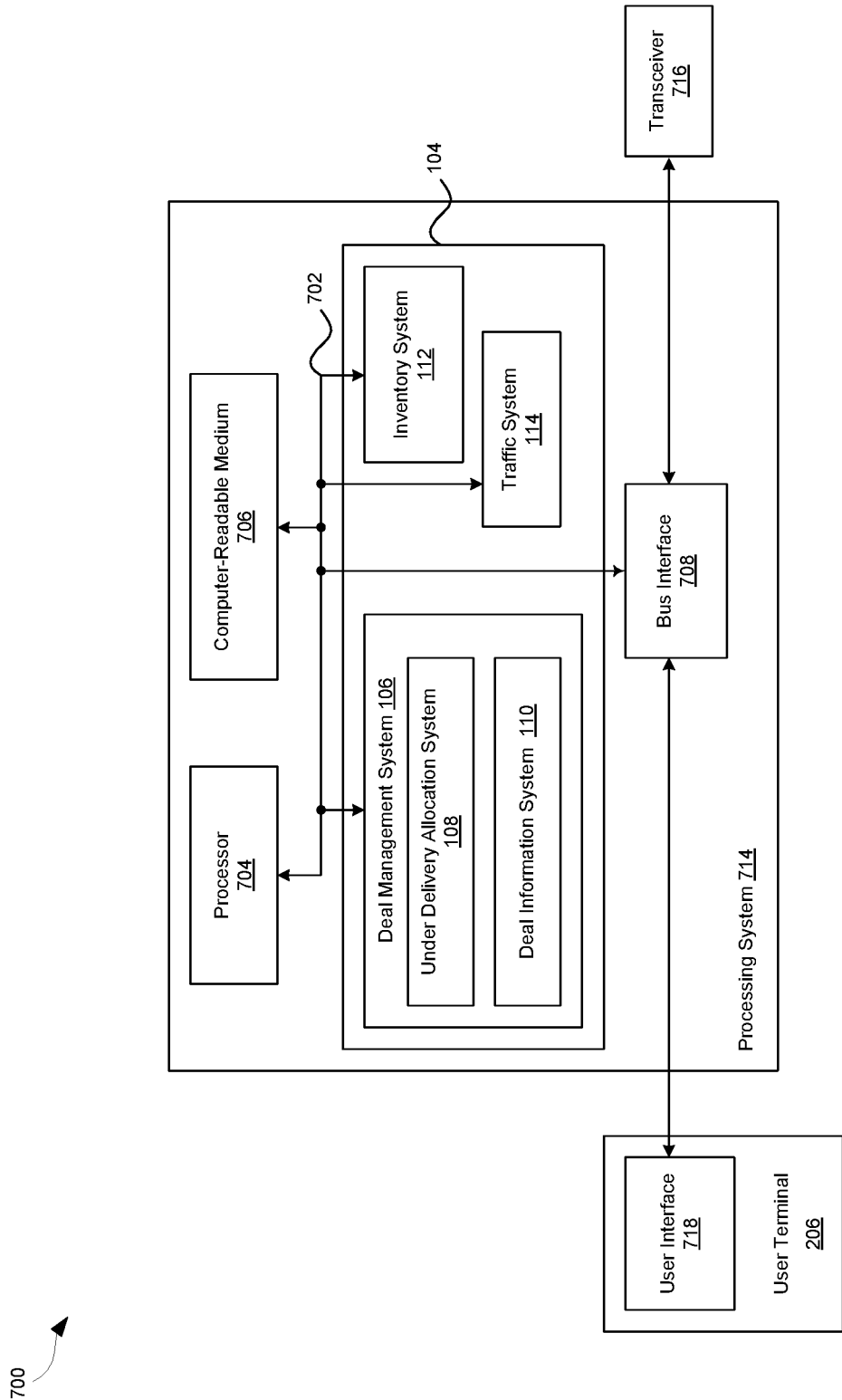
FIG. 7 is a conceptual diagram illustrating an example of a hardware implementation for a television advertisement management system employing a processing system for generating an optimal allocation of under delivery units, in accordance with an exemplary embodiment of the disclosure.

FIG. 7 is a conceptual diagram illustrating an example of a hardware implementation for a television advertisement management system employing a processing system for generating an optimal allocation of under delivery units, in accordance with an exemplary embodiment of the disclosure. Referring to FIG. 7, the hardware implementation for the television advertisement management system 104 employs a processing system 714 for generating an optimal allocation of under delivery units across a plurality of deals, in accordance with an exemplary embodiment of the disclosure, as described herein. In some examples, the processing system 714 may comprise one or more hardware processors 704, computer-readable medium 706, a hardware traffic system 114, a hardware deal management system 106, and a hardware inventory system 112. The hardware deal management system 106 may comprise a hardware under delivery allocation system 108, and a hardware deal information system 110.

In this example, the television advertisement management system 104 employing the processing system 714 may be implemented with a bus architecture, represented generally by the bus 702. The bus 702 may include any number of interconnecting buses and bridges depending on the specific implementation of of the television advertisement management system 104 and the overall design constraints. The bus 702 links together various circuits including the one or more processors, represented generally by the processor 704, the computer-readable media, represented generally by the computer-readable medium 706, the hardware traffic system 114, the hardware deal management system 106, the hardware inventory system 112, the hardware under delivery allocation system 108, and the hardware deal information system 110, which may be configured to carry out one or more methods or procedures described herein.

The bus interface 708 provides an interface between the bus 702 and a transceiver 716. The transceiver 716 provides a means for communicating via the network 120 with various other apparatus such as the advertiser order generation systems 130a, . . . , 130n, and the consumer devices 132a, . . . , 132n.

The user terminal 206 may comprise a keypad, display, speaker, microphone, pointing to enable a user such as a planner to interact with the television advertisement management system 104. The user terminal 206 may be operable to present a user interface 718 that enables the user such as a planner to configure and interact with components such as the under delivery allocation system 108. The user interface 604 (FIG. 6) is an example the user interface 718.

The processor 704 may be operable to manage the bus 702 and general processing, including the execution of software stored on the computer-readable medium 706. The software, when executed by the processor 704, causes the television advertisement management system 104 to perform the various functions described herein for any particular apparatus. The computer-readable medium 706 may also be used for storing data that is manipulated by the processor 704 when executing software. The computer-readable medium 706 may also be operable to store data for one or more of the hardware traffic system 114, the hardware deal management system 106, the hardware inventory system 112, the hardware under delivery allocation system 108, and/or the hardware deal information system 110.

In an aspect of the disclosure, the processor 704, the computer-readable medium 706, or a combination of both may be configured or otherwise specially programmed to perform the functionality of the hardware traffic system 114, the hardware deal management system 106, the hardware inventory system 112, the hardware under delivery allocation system 108, and/or the hardware deal information system 110, or various other components described herein. For example, processor 704, computer-readable medium 706, or a combination of both may be configured or otherwise specially programmed to perform the operations and functionality of the hardware traffic system 114, the hardware deal management system 106, the hardware inventory system 112, the hardware under delivery allocation system 108, and/or the hardware deal information system 110 as described with respect to FIG. 3 and FIG. 4, and/or the like.

Exemplary Mathematical Programming Formulation

Exemplary embodiments of the disclosure provide a mixed integer model, which is utilized to optimize allocation of audience deficiency units. The mixed integer model utilizes a plurality of discrete and continuous variables to represent the attributes or covariates associated with the deals. An objective function of the mixed integer model is provided for generating an optimal allocation of audience deficiency units. Exemplary mathematical programming formulations for each of these phases and stages are provided, and includes, for example, sets, parameters, and decision variables that are used across the formulations.

Sets $\mathcal{D}$ =the set of all deal, indexed by d.
S=the set of all selling titles, indexed by s.
$S_d$=the subset of selling titles on deal d.
W=the set of all weeks in the allocation period, indexed by w.
$\mathcal{C}$ =the set of all product conflict categories, indexed by c.
$\mathcal{G}$ =the set of all selling titles groups, indexed by g. $\cup_{g \in G}$=S and $g1 \cap g2 = \phi$.
$\mathcal{P}$ =the set of all selling title packages, indexed by p.

Parameters $T_d$=Target demographic for deal d.
$M_d$=Dollar value of UD impressions for deal d (Current quarter CPM).
$B_d^M$=Dollar balance for deal d. (A negative dollar balance represents a deficit).
$J_d$=Guaranteed impressions for deal d.
$B_d^E$=Impression balance for deal d.
$I_d^C$=Current impression index of deal d.
$I_d^L$, $I_d^U$=Lower and upper impression index targets for deal d, $I_d^L \geq I_d^C$, $I_d^U \geq I_d^L$.
$P_d$=Product conflict code associated with deal d.
$R_d$=Ratecard type for deal d.
$F_{gd}^G$=Target proportion of units in deal d to be allocated to selling titles in group g.
$F_{dw}^W$=Target proportion of units in deal d to be allocated on week w for a given selling title.
$A_{sw}$=Number of UD units available on selling title s in week w.
$Q_{swc}$=Number of c-category units that can still be scheduled on selling title s in week w without violating product-conflict constraints.
$O_{dew}$=Number of units that can still air on selling title s in week w for deal d without violating time-separation constraints.
$E_{ew}^{TR}$=Number of people in target demographic T that are expected to watch selling title a in week w according to ratecard type R.
$\beta$=Proportion of liability reduction that can be given up to attain a better unit spread across selling titles and weeks.
$\pi^G$, $\pi^W$=Penalties associated with the deviations from unit targets across selling title groups and across weeks, respectively.

Decision Variables $x_{dew}$=Number of UD units allocated to deal d on selling title a in week w.
$\theta_d$=Total number of UD units allocated to deal d.
$y_d$=Total UD impressions allocated to deal d.
$z_{dpw}$=Number of units from package p allocated to deal d in week w.
$i_d^N$=New impression index for deal d.
$v_d$=Value of the UD units assigned to deal d.
$\lambda$=Overall liability reduction across all deals.
$\delta_{gd}^{G+}$, $\delta_{gd}^{G-}$=Positive and negative deviations from the goal on the number of UD units allocated to deal d on selling titles in group g.
$\Delta_d^G$=Maximum deviation across the selling title group unit goals for deal d.
$\delta_{dew}^{W+}$, $\delta_{dew}^{W-}$=Positive and negative deviations from the goal on the number of UD units allocated to deal d on selling title s in week w.
$\Delta_{de}^W$=Maximum deviation across the weekly goal unit goals for deal d on selling title s.
$\alpha_s$=Remaining units on selling title a after allocation across all weeks.
$\psi_{de}$=Boolean variable that equals 1 if selling title a can be substituted by other selling titles on its group, and equals 0 otherwise.

Exemplary Phase 1 Formulation

In phase 1, audience deficiency units may be allocated to bring all deals as close as possible to their desired lowered target. If all deals cannot be brought to their target, the allocation maximizes the value of the allocated under deliver units (i.e., it maximizes the liability reduction).

Maximize Objective Function:

$$\lambda = \sum_{d \in \mathcal{D}} v_d \quad (O1)$$

Subject to:

$$v_d \leq M_d y_d, \forall d \in \mathcal{D} \quad (1)$$

$$v_d \leq \max(0, B_d^M), \forall d \in \mathcal{D} \quad (2)$$

$$v_d \leq (I_d^L - I_d^C) M_d J_d, \forall d \in \mathcal{D} \quad (3)$$

$$\sum_{d \in \mathcal{D}} x^{dsw} \leq A_{sw}, \forall s \in \mathcal{S}, \forall w \in \mathcal{W} \quad (4)$$

$$\sum_{\{d \in \mathcal{D}_t P_d = c\}} x^{dsw} \leq Q_{swc}, \forall c \in C, \forall s \in \mathcal{S}, \forall w \in \mathcal{W} \quad (5)$$

$$x_{dsw} \leq O^{dsw}, \forall d \in \mathcal{D}, \forall s \in \mathcal{S}, \forall w \in \mathcal{W} \quad (6)$$

$$y_d = \sum_{s \in \mathcal{S}} \sum_{w \in \mathcal{W}} E_{sw}^{T_d R_d} x_{dsw}, \forall d \in \mathcal{D} \quad (7)$$

$$i_d^N = I_d^C + y_d/J_d, \forall d \in \mathcal{D} \quad (8)$$

$$i_d^N \leq I_d^U, \forall d \in \mathcal{D} \quad (9)$$

$$\alpha_s = \sum_{w \in \mathcal{W}} A_{sw} - \sum_{d \in \mathcal{D}} \sum_{w \in \mathcal{W}} x_{dsw}, \forall s \in \mathcal{S} \quad (10)$$

$$\sum_{\{a \in g c \in g, e^j \neq s\}} x_{ds'w} <= M \psi_{ds}, \forall d \in \mathcal{D}, \forall s \in \mathcal{S}_d \quad (11)$$

$$\alpha_s \leq M(1 - \psi_{ds}), \forall d \in \mathcal{D}, \forall s \in \mathcal{S}_d \quad (12)$$

$$z_{dpe} = x_{dsw}, \forall d \in \mathcal{D}, \forall p \in \mathcal{P}, \forall s \in p \cap \mathcal{S}_d, \forall w \in \mathcal{W} \quad (13)$$

$$x_{dsw} \in \mathbb{Z}^+$$

$$\Theta_d, y_d, z_{dpw}, i_d^N, v_d, \delta_{gd}^{G+}, \delta_{gd}^{G-}, \Delta_d^G, \delta_{dsw}^{W+}, \delta_{dsw}^{W-}, \Delta_{ds}^W, \alpha, \in \mathbb{R}^+$$

$$\psi_{ds} \in \{0, 1\}$$

The objective function (O1) maximizes the total value of the under delivery allocation across all deals for a particular network. The effective under delivery value of a given deal is the minimum between the gross value of the units allocated to the deal (current quarter CPM times the number of impressions resulting from the allotted units) and the deal dollar deficit (deals with a positive dollar balance have zero deficit). In addition, for Phase I, this value may also be capped once the deal reaches its desired lower target, which ensures all deals will be brought as close as possible to their lower targets. This yields the following expression for the under delivery value of a given deal d:

$$v_d = \min\{M_d y_d, \max(0, B_d^M), (I_d^L - I_d^C) M_d J_d\}$$

Constraints (4)-(6) enforce the airtime capacity constraints. The units allocated across all deals to a selling title-week should not exceed the available units (5), the number of units of a specific conflict code assigned to a selling title-week cannot surpass the maximum units that can still be scheduled for that conflict code (6), and the number of units allocated to a given deal on a specific selling title-week cannot exceed the maximum number of units that could be later scheduled given time separation requirements. Note that constraint (6) can simply be enforced as an upper bound on the decision variables.

Constraint (7) is an expression that defines the total number of impressions allocated to deal d, which equals the total units assigned to that deal across all selling title-weeks, weighted by the estimated audience on each selling title-week in the corresponding target demographic and ratecard.

Constraints (8) and (9) relate to the new impression index for deal d. The new impression index equals the current index, plus the proportion of newly allocated impressions to guaranteed impressions (8), and this new impression index cannot exceed the desired upper target (9).

Constraints (10)-(12) impose the correct usage of surrogate selling titles, i.e., that a deal can be assigned units on a selling title which is a surrogate of the original selling title that appears on the deal if and only if all available units of the original selling title have been consumed. Constraint (10) states that the remaining units that are available for selling title s is the difference between all units originally available minus all units assigned across all deals. Constraints (11) and (12) are disjunctive constraints stating that either all units of selling title s have been exhausted ($\psi_{ds}=1$), and units may be assigned to a surrogate selling title, or there are units still remaining for selling title s ($\psi_{ds}=0$) and as such no units can be assigned to surrogate selling titles. The big-M coefficients used in these constraints should be made as small as possible to avoid numerical issues.

Constraint (13) enforces selling title packaging rules, i.e., that the same number of units assigned on a selling title-week must be equal for all selling titles that were sold as a package on a deal.

Exemplary Phase 2, Stage 1 Formulation

In phase 2, stage 1, audience deficiency units may be allocated to maximize the overall liability reduction (i.e., maximizes the value of the allocated under delivery units) subject to the attainable lower targets.

Maximize Objective Function:

$$\lambda = \sum_{d \in \mathcal{D}} v_d \quad (O2)$$

Subject to:
(1)-(2)
(4)-(13)

$$i_d^N \geq \min(i_d^L, i_d^{N*}(1)), \exists d \in \mathcal{D} \quad (14)$$

The objective function (O2) is once again to maximize the total value of the under delivery allocation across all deals for a network. Therefore, it is assimilate to (O1). However, the definition of $v_d$ changes for this phase as the value is no longer capped by the lower target. For this phase, the value of the under delivery for a given deal d becomes:

$$v_d = \min\{M_d y_d, \max(0, B_d^M)\}$$

Constraints (1) and (2) linearize this expression; constraints (4)-(13) are still valid in this phase, and constraint (14) enforces the attainable lower bound on the new impression index for deal d, which is the minimum between the original lower targets and the impression index resulting from the Phase I allocation $i_d^{N*}(1)$.

Exemplary Phase 2, Stage 2 Formulation

In phase 2, stage 2, audience deficiency units are allocated to minimize the total penalty from deviations from selling title mix distributions and weekly distributions subject to an additional lower bound on the overall under delivery value that has to be attained.

Minimize Objective Function:

$$\pi^G \sum_{d \in \mathcal{D}} \Delta_d^G + \pi^W \sum_{d \in \mathcal{D}} \sum_{s \in S} \Delta_{ds}^W \quad (O3)$$

Subject to:

(1)-(2)

(4)-(14)

$$\Theta_d = \sum_{s \in S} \sum_{w \in W} x_{dsw}, \forall d \in \mathcal{D} \quad (15)$$

$$\sum_{w \in W} \sum_{g \in g} x_{dsw} + \delta_{gd}^{G+} - \delta_{gd}^{G-} = F_{gd}^G \Theta_d, \forall d \in \mathcal{D}, \forall g \in \mathcal{G} \quad (16)$$

$$\Delta_d^G \geq \delta_{gd}^{G+}, \forall g \in \mathcal{G}, \forall d \in \mathcal{D} \quad (17)$$

$$\Delta_d^G \geq \delta_{gd}^{G-}, \forall g \in \mathcal{G}, \forall d \in \mathcal{D} \quad (18)$$

$$x_{dsw} + \delta_{dsw}^{W+} - \delta_{dsw}^{W-} = F_{dw}^W \Theta_d, \forall d \in \mathcal{D}, \forall s \in \mathcal{S}, \forall w \in \mathcal{W} \quad (19)$$

$$\Delta_{ds}^W \geq \delta_{dsw}^{W+}, \forall d \in \mathcal{D}, \forall s \in \mathcal{S}, \forall w \in \mathcal{W} \quad (20)$$

$$\Delta_{ds}^W \geq \delta_{dsw}^{W-}, \forall d \in \mathcal{D}, \forall s \in \mathcal{S}, \forall w \in \mathcal{W} \quad (21)$$

$$\sum_{d \in \mathcal{D}} v_d \geq (1-\beta)\lambda^*(2A) \quad (22)$$

The objective function (O3) minimizes the sum of total penalties resulting from the maximum deviations across the selling title group unit goals by deal and the penalties resulting from the maximum deviations across weekly unit goals by deal-selling title.

Constraints (1), (2), and (4)-(14) are still valid in this phase and have the same interpretations as before, whereas constraint (15) is an expression that quantifies the total number of units allocated to deal d across all selling title-weeks.

Constraints (16)-(18) quantify the maximum deviations across the selling title group unit goals by deal. These maximum deviations are defined as:

$$\Delta_d^G = \max_{d \in \mathcal{D}, g \in \mathcal{G}} \left| F_{gd}^G \Theta_d - \sum_{w \in W} \sum_{s \in g} x_{dsw} \right|$$

These expressions can be linearized in two steps. first, the absolute value is linearized by modeling it as the difference of two non-negative variables:

$\delta_{gd}^{G+}$ and $\delta_{gd}^{G-}$

Constraint (16) represents this transformation. Second, the maximum is linearized by noting that the maximum deviation must be at least as big of each one of its elements. Constraints (17) and (18) enforce this logic. Since the objective is minimization, at optimality one of these constraints will be binding.

Constraints (19)-(21) quantify the maximum deviations across weekly unit goals by deal-selling title. These maximum deviations are defined as:

$$\Delta_{ds}^W = \max_{d \in \mathcal{D}, s \in S, w \in W} |F_{dw}^W \Theta_d - x_{dsw}|$$

The logic to linearize these expressions parallels the one presented above.

Finally, constraint (22) enforces a lower bound on the overall under delivery value that results from the allocation. This value is a proportion of the optimal value $\lambda^*(2A)$ from phase 2, stage 1, in which no selling title mix distribution goals or weekly distribution goals were considered. Solutions times for the phase 1, and phase 2 stage one may occur rather quickly, and the solution for phase 2 stage 2 may be capped at a certain time, for example, 15 minutes.

Various embodiments of the disclosure comprise a television advertising management system 104 that may be operable to handle a plurality of deals for a plurality of advertisers. The television advertising management system 104 may comprise, for example, a deal management system 106, an inventory system 112, a traffic system 114, an order generation system 144, and a spot scheduler 154. The deal management system 106 may comprise an under delivery allocation system 108, and a deal information system 110. The deal management system 106 may be operable to determine which of the plurality of deals have a guaranteed audience, and are under delivering, and the under delivery allocation system 108 may be operable to allocate reserve under delivery units to each of the plurality of deals that are under delivering to bring each of the plurality of deals that are under delivering to corresponding attainable lower targets while honoring corresponding deal constraints. Determining which of the plurality of deals have a guaranteed audience, and are under delivering includes determining by the deal management system 106, for each of the plurality of deals that have the guaranteed audience, the guaranteed audience, a gross sum of delivered audience spots that have aired, and a gross sum of estimated audience for spots that have not aired. Determining which of the plurality of deals have a guaranteed audience, and are under delivering may further include determining by the deal management system 106, for each of the plurality of deals that have the guaranteed audience, whether the sum of the gross sum of delivered audience spots that have aired, and the gross sum of estimated audience for spots that have not aired is less than the guaranteed audience. Determining which of the plurality of deals have a guaranteed audience, and are under delivering may further include filtering by the deal management system 106, the plurality of deals based on criteria comprising, for example, at least a deal index, a monetary value of the deal, whether a deal is an aged deal, and whether a deal is a hiatus deal.

The under delivery allocation system 108 may be operable to maximize the under delivery value such that the attainable lower targets are met, while honoring corresponding deal constraints to provide an allocation solution. The under delivery allocation system 108 may be operable to minimize a total penalty from deviations from selling title mix distributions, and weekly distributions for each of the plurality of deals that are under delivering subject to an additional lower bound on the under delivery value. The under delivery allocation system 108 may be operable to maximize the under delivery value up to corresponding attainable upper targets such that the attainable lower targets are met, while honoring corresponding deal constraints to provide the allocation solution. The additional lower bound on the under delivery value may represent a total percentage of the maximum under delivery value that could be attained and is computed by determining a percentage to be given up to attain selling title mix distributions, and weekly distributions that are closer to requirements of corresponding advertisers. In order to minimize the total penalty from deviations, the under delivery allocation system 108 may be operable to adjust the allocation solution such that the attainable targets, and percentage of the maximized under delivery value are met, and minimize the deviations from the selling title mix distributions, and weekly distributions while honoring the corresponding deal constraints. The deal information system 110 may generate under delivery deal reserves based on the allocation solution, and an order generation system 144 may generate under delivery orders based on the under delivery deal reserves. The spot scheduler 154 may schedule the under delivery spots based on the generated under delivery orders. The deal information system 110 may adjust a deal index for each of the plurality of deals that have a guaranteed audience, and are under delivering based on the scheduling of the under delivery spots.

It should be understood that although the various embodiments of the disclosure are described with respect to guaranteed demographics, the disclosure is not limited to guaranteed demographics. Accordingly, the various embodiments of the disclosure are applicable to any other type of metric that is guaranteed, for example, targets, without departing from the spirit and scope of the disclosure. U.S. application Ser. No. 14/842,808, entitled, "targeting and demographics scheduling utilizing a framework for audience rating estimation," discloses an exemplary targeting metric. U.S. application Ser. No. 14/930,586, entitled, "generation of reach mixture, and pricing utilizing a framework for audience rating estimation," discloses an exemplary reach metric.

The under delivery allocation system 108 provides significant productivity improvements since the process of allocating audience deficiency units across hundreds of deals has been reduced from weeks to minutes. Since the under delivery allocation system 108 enables planners to run different scenarios in which the planners may change the values of various parameters such as the minimum target and maximum target, for different sets of deals and quickly obtain an optimal under delivery allocation for those parameters, the under delivery allocation system 108 enable planners to test and evaluate different scenarios, which the planners were simply unable to do with the prior manual under allocation processes. The under delivery allocation system 108 also provides monetary benefits in additional liability reduction per year with respect to the manual process.

The under delivery allocation system 108 also enables the television program management system 104 to operate more efficiently. For example, when the under delivery allocation system 108 generates an optimal allocation of under delivery units, the allocation solution may be generated utilizing less memory than would otherwise be required resulting in much faster processing time (faster computation time without sacrificing accuracy). This enables a plurality of under delivery allocation scenarios or plans to be run in a much shorter time, and the results of a selected allocation may be propagated in a much faster manner to other hardware components in the television advertisement management system 104 to more efficiently and quickly schedule allocation of the under delivery units. The ability to quickly compute optimal under delivery allocation solutions for a given set of parameters may free up valuable processing resources such as memory and computing power, which may be utilized when the under delivery allocation system 108 runs optimal under delivery allocation solutions.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for the allocation of under delivery units utilizing an optimization framework.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A method for use in a hardware television advertising management system that includes:
   an interface to handle a plurality of deals for a plurality of advertisers;
   a memory for storing instructions; and
   a processor, the processor executes the instructions to perform a method, the method comprising a step of:
   determining, by the processor, the plurality of deals that have a guaranteed audience and that are under delivering;
   generating, by the processor, a plurality of scenarios that includes a plurality of parameters of the plurality of deals;
   receiving, via the interface, a change in a value of the plurality of parameters of the plurality of deals;
   searching for one deal from the plurality of deals that meet a certain criteria based on an index of the one deal that is below a threshold value;
   executing, by the processor, each scenario of the generated plurality of scenarios with change in a value of a minimum target, a maximum target, or different sets of deals of the plurality of deals in each phase of a plurality of phases for generation of an optimal allocation solution of reserve under delivery units across the plurality of deals,
   wherein each scenario of the generated plurality of scenarios is executed with the change in the value of the minimum target, the maximum target, or the different sets of deals in each phase based on the searched one deal, and
   wherein each scenario of the generated plurality of scenarios is executed based on the change in the value of the plurality of parameters of the plurality of deals;
   partitioning a liability inventory reserve into individual deal reserves with a corresponding reserve under delivery units based on the searched one deal and the optimal allocation solution of the reserve under delivery units across the plurality of deals;
   allocating, by the processor, the reserve under delivery units to each of the plurality of deals to attain a corresponding first target of each of the plurality of deals,
   wherein the plurality of deals are allocated with the reserve under delivery units, based on the generated plurality of scenarios and corresponding deal constraints of each of the plurality of deals;
   maximizing, by the processor, a value of the reserve under delivery units of each of the plurality of deals based on the generated plurality of scenarios and the corresponding deal constraints;
   generating, by the processor, an allocation solution based on an objective function and each scenario of the generated plurality of scenarios that is executed with change in the value of the minimum target, the maximum target, or the different sets of deals of the plurality of deals and the maximization of the value of the reserve under delivery units,
   wherein the objective function maximizes the value of the reserve under delivery units of each of the plurality of deals while the corresponding deal constraints of each of the plurality of deals are maintained,
   wherein a deviation from an objective for selling title mix distributions and weekly distributions for each of the plurality of deals are added as penalties in the objective function,
   wherein the penalties that are under delivering for each of the plurality of deals are adjusted based on a total percentage of the maximum under delivery value to attain selling title mix distributions and the weekly distributions while the corresponding deal constraints are maintained;

minimizing deviations from the selling title mix distributions and the weekly distributions for each of the plurality of deals, based on an additional bound on the maximized value of the reserve under delivery units; and generating, by the processor, the optimal allocation solution, based on the minimized deviations and the additional bound on the value of the reserve under delivery units, that is presented on the interface.

2. The method according to claim 1, wherein the method further comprising the step of:
adjusting the allocation solution to attain the corresponding first target and a percentage of the maximized value of the reserve under delivery units,
wherein the deviations from the selling title mix distributions and the weekly distributions are minimized based on the corresponding deal constraints.

3. The method according to claim 1,
wherein the additional bound on the maximized value of the reserve under delivery units represents a limitation in a first percentage of the maximized value of the reserve under delivery units, and
wherein the additional bound is computed based on a determination of a second percentage of the maximized value of the reserve under delivery units to be reduced to attain a minimum deviation in the selling title mix distributions and the weekly distributions for each of the plurality of deals.

4. The method according to claim 1, wherein the method further comprising the step of:
maximizing the value of the reserve under delivery units to a corresponding second target of each of the plurality of deals, such that the corresponding first target is attained based on the corresponding deal constraints to provide the allocation solution,
wherein the corresponding second target is higher than the corresponding first target.

5. The method according to claim 1, wherein the method further comprising the step of:
determining the guaranteed audience, a gross sum of delivered audience spots that have aired, and a gross sum of estimated audience for spots that have not aired.

6. The method according to claim 5, wherein the method further comprising the step of:
determining a sum, of the gross sum of the delivered audience spots that have aired and the gross sum of the estimated audience for the spots that have not aired, is less than the guaranteed audience.

7. The method according to claim 1, wherein the method further comprising the step of filtering the plurality of deals based on a deal index, a monetary value of each of the plurality of deals, whether each of the plurality of deals is an aged deal, or whether each of the plurality of deals is a hiatus deal.

8. The method according to claim 1, wherein the method further comprising the step of generating the reserve under delivery units based on the allocation solution.

9. The method according to claim 8, wherein the method further comprising the step of generating under delivery orders based on the generated reserve under delivery units.

10. The method according to claim 9, wherein the method further comprising the step of scheduling under delivery spots based on the generated under delivery orders.

11. The method according to claim 10, wherein the method further comprising the step of adjusting a deal index for each of the plurality of deals based on the scheduling of the under delivery spots.

12. The method according to claim 1, wherein the objective function minimizes a sum of the penalties based on selling title group unit goals and weekly unit goals.

13. A system, comprising:
an interface;
a memory for storing instructions; and
a processor, the processor executes the instructions to perform a method, the method comprising:
a step of determining the plurality of deals that have a guaranteed audience and that are under delivering;
a step of generating a plurality of scenarios that includes a plurality of parameters of the plurality of deals;
a step of controlling the interface to receive a change in a value of the plurality of parameters of the plurality of deals;
a step of searching for one deal from the plurality of deals that meet a certain criteria based on an index of the one deal that is below a threshold value;
a step of executing each scenario of the generated plurality of scenarios with change in a value of a minimum target, a maximum target, or different sets of deals of the plurality of deals in each phase of a plurality of phases for generation of an optimal allocation solution of reserve under delivery units across the plurality of deals,
wherein each scenario of the generated plurality of scenarios is executed with the change in the value of the minimum target, the maximum target, or the different sets of deals in each phase based on the searched one deal, and
wherein each scenario of the generated plurality of scenarios is executed based on the change in the value of the plurality of parameters of the plurality of deals;
a step of partitioning a liability inventory reserve into individual deal reserves with a corresponding reserve under delivery units based on the searched one deal and the optimal allocation solution of the reserve under delivery units across the plurality of deals;
a step of allocating the reserve under delivery units to each of the plurality of deals to attain a corresponding first target of each of the plurality of deals,
wherein the plurality of deals are allocated with the reserve under delivery units, based on the generated plurality of scenarios and corresponding deal constraints of each of the plurality of deals;
a step of maximizing a value of the reserve under delivery units of each of the plurality of deals based on the generated plurality of scenarios and the corresponding deal constraints;
a step of generating an allocation solution based on an objective function and each scenario of the generated plurality of scenarios that is executed with change in the value of the minimum target, the maximum target, or the different sets of deals of the plurality of deals and the maximization of the value of the reserve under delivery units,
wherein the objective function maximizes the value of the reserve under delivery units of each of the plurality of deals while the corresponding deal constraints of each of the plurality of deals are maintained, and wherein a deviation from an objective for selling title mix distributions and weekly distributions for each of the plurality of deals are added as penalties in the objective function, and wherein the penalties that are under delivering for each of the plurality of deals are adjusted based on a total percentage of the maximum under delivery value to attain selling title mix distributions and the weekly distributions while the corresponding deal constraints are maintained;

a step of maximizing deviations from the selling title mix distributions and the weekly distributions for each of the plurality of deals, based on an additional bound on the maximized value of the reserve under delivery units; and a step of generating the optimal allocation solution, based on the minimized deviations and the additional bound on the value of the reserve under delivery units, that is presented on the interface.

14. The system according to claim 13, wherein the method further comprises:

a step of adjusting the allocation solution to attain the corresponding first target and a percentage of the maximized value of the reserve under delivery units, wherein the deviations from the selling title mix distributions and the weekly distributions are minimized based on the corresponding deal constraints.

15. The system according to claim 13, wherein the additional bound on the maximized value of the reserve under delivery units represents a limitation in a first percentage of the maximized value of the reserve under delivery units, and wherein the additional bound is computed based on a determination of a second percentage of the maximized value of the reserve under delivery units to be reduced to attain a minimum deviation in the selling title mix distributions and the weekly distributions for each of the plurality of deals.

16. The system according to claim 13, wherein the method further comprises a step of maximizing the value of the reserve under delivery units to a corresponding second target of each of the plurality of deals, such that the corresponding first target is attained based on the corresponding deal constraints to provide the allocation solution, and wherein the corresponding second target is higher than the corresponding first target.

17. The system according to claim 13, wherein the method further comprises a step of determining the plurality of deals based on a determination of the guaranteed audience, a gross sum of delivered audience spots that have aired, and a gross sum of estimated audience for spots that have not aired.

18. The system according to claim 17, wherein the method further comprises a step of determining the plurality of deals based on a determination of a sum, of the gross sum of the delivered audience spots that have aired and the gross sum of the estimated audience for the spots that have not aired, is less than the guaranteed audience.

19. The system according to claim 13, wherein the method further comprises a step of determining the plurality of deals based on a deal index, a monetary value of each of the plurality of deals, whether each of the plurality of deals is an aged deal, and whether each of the plurality of deals is a hiatus deal.

20. The system according to claim 13, wherein the method further comprises a step of generating the reserve under delivery units based on the allocation solution.

21. The system according to claim 20, wherein the method further comprises a step of generating under delivery orders based on the generated reserve under delivery units.

22. The system according to claim 21, wherein the method further comprises a step of scheduling under delivery spots based on the generated under delivery orders.

23. The system according to claim 22, wherein the method further comprises a step of adjusting a deal index for each of the plurality of deals based on the scheduling of the under delivery spots.

24. A non-transitory computer-readable medium having stored thereon computer-executable instructions, which when executed by a computer, cause the computer to execute operations, the operations comprising:

determining a plurality of deals that have a guaranteed audience and that are under delivering;

generating a plurality of scenarios that includes a plurality of parameters of the plurality of deals;

receiving, via an interface, a change in a value of the plurality of parameters of the plurality of deals;

searching for one deal from the plurality of deals that meet a certain criteria based on an index of the one deal that is below a threshold value;

executing each scenario of the generated plurality of scenarios with change in a value of of a minimum target, a maximum target, or different sets of deals of the plurality of deals in each phase of a plurality of phases for generation of an optimal allocation solution of reserve under delivery units across the plurality of deals, wherein each scenario of the generated plurality of scenarios is executed with the change in the value of the minimum target, the maximum target, or the different sets of deals in each phase based on the searched one deal, and wherein each scenario of the generated plurality of scenarios is executed based on the change in the value of the plurality of parameters of the plurality of deals;

partitioning a liability inventory reserve into individual deal reserves with a corresponding reserve under delivery units based on the searched one deal and the optimal allocation solution of the reserve under delivery units across the plurality of deals;

allocating the reserve under delivery units to each of the plurality of deals to attain a corresponding first target of each of the plurality of deals, wherein the plurality of deals are allocated with the reserve under delivery units, based on the generated plurality of scenarios and corresponding deal constraints of each of the plurality of deals;

maximizing a value of the reserve under delivery units of each of the plurality of deals based on the generated plurality of scenarios and the corresponding deal constraints;

generating an allocation solution based on an objective function and each scenario of the generated plurality of scenarios that is executed with change in the value of the at minimum target, the maximum target, or the different sets of deals of the plurality of deals and the maximization of the value of the reserve under delivery units, wherein the objective function maximizes the value of the reserve under delivery units of each of the plurality of deals while the corresponding deal constraints of each of the plurality of deals are maintained, wherein a deviation from an objective for selling title mix distributions and weekly distributions for each of the plurality of deals are added as penalties in the objective function, and wherein the penalties that are under delivering for each of the plurality of deals are adjusted based on a total percentage of the maximum under delivery value to attain selling title mix distributions and the weekly distributions while the corresponding deal constraints are maintained;

minimizing deviations from the selling title mix distributions and the weekly distributions for each of the plurality of deals, based on an additional bound on the maximized value of the reserve under delivery units; and generating the optimal allocation solution, based on the minimized deviations and the additional bound on the value of the reserve under delivery units, that is presented on the interface.

25. The non-transitory computer-readable medium according to claim 24, further comprising:

adjusting the allocation solution to attain the corresponding first target and a percentage of the maximized value of the reserve under delivery units, wherein the deviations from the selling title mix distributions and the weekly distributions are minimized based on the corresponding deal constraints.

26. The non-transitory computer-readable medium according to claim 24, wherein the additional bound on the maximized value of the reserve under delivery units represents a limitation in a first percentage of the maximized value of the reserve under delivery units, and wherein the additional bound is computed based on a determination of a second percentage of the maximized value of the reserve under delivery units to be reduced to attain a minimum deviation in the selling title mix distributions and the weekly distributions for each of the plurality of deals.

27. The non-transitory computer-readable medium according to claim 24, further comprising maximizing the value of the reserve under delivery units to a corresponding second target of each of the plurality of deals, such that the corresponding first target is attained based on the corresponding deal constraints to provide the allocation solution, wherein the corresponding second target is higher than the corresponding first target.

28. The non-transitory computer-readable medium according to claim 24, further comprising:

determining the guaranteed audience, a gross sum of delivered audience spots that have aired, and a gross sum of estimated audience for spots that have not aired.

29. The non-transitory computer-readable medium according to claim 28, further comprising:

determining a sum, of the gross sum of the delivered audience spots that have aired and the gross sum of the estimated audience for the spots that have not aired, is less than the guaranteed audience.

30. The non-transitory computer-readable medium according to claim 24, further comprising filtering the plurality of deals based on a deal index, a monetary value of each of the plurality of deals, whether each of the plurality of deals is an aged deal, or whether each of the plurality of deals is a hiatus deal.

31. The non-transitory computer-readable medium according to claim 24, further comprising generating the reserve under delivery units based on the allocation solution.

32. The non-transitory computer-readable medium according to claim 31, further comprising generating under delivery orders based on the generated reserve under delivery units.

33. The non-transitory computer-readable medium according to claim 32, further comprising scheduling under delivery spots based on the generated under delivery orders.

34. The non-transitory computer-readable medium according to claim 33, further comprising adjusting a deal index for each of the plurality of deals based on the scheduling of the under delivery spots.

* * * * *